United States Patent
Huang et al.

(10) Patent No.: US 12,432,702 B2
(45) Date of Patent: Sep. 30, 2025

(54) COMMUNICATION APPARATUS AND COMMUNICATION METHOD FOR TRIGGER-BASED UPLINK MULTIUSER TRANSMISSION

(71) Applicant: Panasonic Intellectual Property Corporation of America, Torrance, CA (US)

(72) Inventors: Lei Huang, Singapore (SG); Yoshio Urabe, Nara (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 393 days.

(21) Appl. No.: 18/006,359

(22) PCT Filed: Jul. 8, 2021

(86) PCT No.: PCT/SG2021/050402
§ 371 (c)(1),
(2) Date: Jan. 20, 2023

(87) PCT Pub. No.: WO2022/019830
PCT Pub. Date: Jan. 27, 2022

(65) Prior Publication Data
US 2023/0300803 A1 Sep. 21, 2023

(30) Foreign Application Priority Data
Jul. 24, 2020 (SG) .......................... 10202007139P

(51) Int. Cl.
*H04W 72/044* (2023.01)
*H04L 5/00* (2006.01)
*H04W 84/12* (2009.01)

(52) U.S. Cl.
CPC ......... *H04W 72/044* (2013.01); *H04L 5/0037* (2013.01); *H04W 84/12* (2013.01)

(58) Field of Classification Search
None
See application file for complete search history.

(56) References Cited

U.S. PATENT DOCUMENTS

| | | |
|---|---|---|
| 2017/0094664 A1 | 3/2017 | Lee et al. |
| 2017/0208625 A1 | 7/2017 | Choi et al. |

(Continued)

FOREIGN PATENT DOCUMENTS

| | | |
|---|---|---|
| CN | 109644103 A | 4/2019 |
| CN | 109644519 A | 4/2019 |
| WO | 2021187844 A1 | 9/2021 |

OTHER PUBLICATIONS

Ahn et al., "Wider Bandwidth Channel Access in EHT," IEEE 802.11-19/1242r0, Jul. 15, 2019. (11 pages).

(Continued)

*Primary Examiner* — Diane L Lo
(74) *Attorney, Agent, or Firm* — Seed IP Law Group LLP

(57) ABSTRACT

The present disclosure provides communication apparatus and communication method for trigger-based uplink multiuser transmission. A communication apparatus is provided, the communication apparatus comprising: circuitry, which in operation, generates a trigger frame comprising a common info field and a plurality of user info fields; and a transmitter, which in operation, transmits the generated trigger frame; wherein each of the plurality of user info fields comprises a first field which indicates whether a resource unit (RU) adaptation procedure is disabled for another communication apparatus addressed by the each of (Continued)

| | Field names | Field size (bits) |
|---|---|---|
| U-SIG1 | PHY Version Identifier | 3 |
| | UL/DL Flag | 1 |
| | BSS Color | 6 |
| | TXOP Duration | 7 |
| | BW | 3 |
| | PPDU Format | 2 |
| | Puncturing Channel Info | 4 |
| | Spatial Reuse 1 | 4 |
| | Spatial Reuse 2 | 4 |
| | Adapted RU Allocation | 4 |
| | Reserved | 4 |
| | CRC | 4 |
| U-SIG2 | Tail | 6 |
| | Total | 52 |

802

800 the plurality of user info field and a second field which indicates a RU or RU combination allocated to the another communication apparatus.

14 Claims, 21 Drawing Sheets

(56) References Cited

U.S. PATENT DOCUMENTS

| | | | |
|---|---|---|---|
| 2017/0366329 A1 | 12/2017 | Cao et al. | |
| 2018/0176901 A1* | 6/2018 | Huang | H04L 1/0008 |
| 2019/0200387 A1 | 6/2019 | Chitrakar et al. | |
| 2020/0015219 A1* | 1/2020 | Asterjadhi | H04W 72/51 |
| 2021/0281363 A1* | 9/2021 | Wu | H04L 5/0098 |
| 2022/0345275 A1* | 10/2022 | Hu | H04L 5/0037 |
| 2023/0130569 A1 | 4/2023 | Kim et al. | |

OTHER PUBLICATIONS

Chu et al., "EHT BSS with Wider BW," IEEE 802.11-20/0398r2, Mar. 1, 2020. (16 pages).

Hu et al., "Multi-RU Indication in Trigger Frame," IEEE 802.11-20/0416r0, Mar. 12, 2020. (14 pages).

International Search Report, mailed Oct. 4, 2021, for International Patent application No. PCT/SG2021/050402. (3 pages).

Park et al., "Consideration on 320MHz Bandwidth and 16 Spatial Streams," IEEE 802.11-19/0778r0, May 13, 2019. (27 pages).

Extended European Search Report dated Jan. 8, 2024, for the corresponding European Patent Application No. 21847263.7, 12 pages.

* cited by examiner

|  | Field names | Field size (bits) |
|---|---|---|
|  | PHY Version Identifier | 3 |
|  | UL/DL Flag | 1 |
|  | BSS Color | 6 |
|  | TXOP Duration | 7 |
|  | BW | 3 |
|  | PPDU Format | 2 |
| U-SIG1 | Puncturing Channel Info | 4 |
|  | Spatial Reuse 1 | 4 |
|  | Spatial Reuse 2 | 4 |
|  | Reserved | 8 |
|  | CRC | 4 |
| U-SIG2 | Tail | 6 |
|  | Total | 52 |

| BW (MHz) | RU or RU Combination Larger Than 242 Tones | Associated RU or RU Combinations |
|---|---|---|
| 40, 80, 160/80+80, 320/160+160 | RU484 | RU484, RU242 (two options) |
| 80, 160/80+80, 320/160+160 | RU242+RU484 | RU242+RU484, RU484 |
| 80, 160/80+80, 320/160+160 | RU996 | RU996, RU242+RU484 (4 options), RU484 (2 options) |
| 160/80+80, 320/160+160 | RU484+RU996 | RU484+RU996, RU996, RU484+RU242 (4 options) |
| 160/80+80, 320/160+160 | 2×RU996 | 2×RU996, RU484+RU996 (4 options if two RU996 belong to a same 160MHz segment or 0 if two RU996 belong to different 160MHz segment), RU996 (2 options) |
| 320/160+160 | RU484+2×RU996 | RU484+2×RU996, 2×RU996, RU484+RU996 (4 options if two RU966 belong to a same 160MHz segment or 1 option if two RU966 belong to different 160MHz segments) |
| 320/160+160 | 3×RU996 | 3×RU996, 2×RU996 (3 options), RU484+2×RU996 (6 options) |
| 320/160+160 | RU484+3×RU996 | RU484+3×RU996, 3×RU996, 2×RU996 (3 options), RU484+2×RU996 (9 options) |
| 320/160+160 | 4×RU996 (for UL MU-MIMO only) | 4×RU996, RU484+3×RU996 (6 options), 3×RU996 (3 options) |

Fig. 3

|  | Field names | Field size (bits) |
|---|---|---|
| U-SIG1 | PHY Version Identifier | 3 |
|  | UL/DL Flag | 1 |
|  | BSS Color | 6 |
|  | TXOP Duration | 7 |
|  | BW | 3 |
|  | PPDU Format | 2 |
|  | Puncturing Channel Info | 4 |
|  | Spatial Reuse 1 | 4 |
|  | Spatial Reuse 2 | 4 |
| U-SIG2 | Adapted RU Allocation | 4 |
|  | Reserved | 4 |
|  | CRC | 4 |
|  | Tail | 6 |
|  | Total | 52 |

Fig. 8

| Allocated RU or RU Combination Larger than 242 Tones | B3B2B1B0 of the Adapted RU Allocation field | Adapted RU |
|---|---|---|
| RU484 | 0 | Allocated RU |
| | 1 | 1st RU242 within allocated RU |
| | 2 | 2nd RU242 within allocated RU |
| | 3-15 | Reserved |
| RU242+RU484 | 0 | Allocated RU |
| | 1 | RU484 of allocated RU |
| | 2-15 | Reserved |
| RU996 | 0 | Allocated RU |
| | 1 | 1st RU242+2nd RU484 within allocated RU |
| | 2 | 2nd RU242+2nd RU484 within allocated RU |
| | 3 | 3rd RU242+1st RU484 within allocated RU |
| | 4 | 4th RU242+1st RU484 within allocated RU |
| | 5 | 1st RU484 within allocated RU |
| | 6 | 2nd RU484 within allocated RU |
| | 7-15 | Reserved |
| RU484+RU996 | 0 | Allocated RU |
| | 1 | RU996 of allocated RU |
| | 2 | 1st RU242+2nd RU484 within RU996 of allocated RU |
| | 3 | 2nd RU242+2nd RU484 within RU996 of allocated RU |
| | 4 | 3rd RU242+1st RU484 within RU996 of allocated RU |
| | 5 | 4th RU242+1st RU484 within RU996 of allocated RU |
| | 6-15 | reserved |

| Allocated RU or RU Combination Larger than 242 Tones | B3B2B1B0 of the Adapted RU Allocation field | Adapted RU |
|---|---|---|
| | 0 | Allocated RU |
| | 1 | 1st RU996 of allocated RU |
| | 2 | 2nd RU996 of allocated RU |
| | 3 | 1st RU484 within 1st RU996 of allocated RU+2nd RU996 of allocated RU |
| 2xRU996 (two RU996 belong to a same 160MHz segment) | 4 | 2nd RU484 within 1st RU996 of allocated RU+2nd RU996 of allocated RU |
| | 5 | 1st RU484 within 2nd RU996 of allocated RU+1st RU996 of allocated RU |
| | 6 | 2nd RU484 within 2nd RU996 of allocated RU+1st RU996 of allocated RU |
| | 7-15 | Reserved |
| | 0 | Allocated RU |
| 2xRU996 (two RU996 belong to different 160MHz segments) | 1 | 1st RU996 of allocated RU |
| | 2 | 2nd RU996 of allocated RU |
| | 3-15 | Reserved |
| | 0 | Allocated RU |
| | 1 | 2xRU996 of allocated RU |
| | 2 | 1st RU484 within 1st RU996 of allocated RU+2nd RU996 of allocated RU |
| RU484+2xRU996 (two RU996 belong to a same 160MHz segment) | 3 | 2nd RU484 within 1st RU996 of allocated RU+2nd RU996 of allocated RU |
| | 4 | 1st RU484 within 2nd RU996 of allocated RU+1st RU996 of allocated RU |
| | 5 | 2nd RU484 within 2nd RU996 of allocated RU+1st RU996 of allocated RU |
| | 6-15 | reserved |
| | 0 | Allocated RU |
| RU484+2xRU996 (two RU996 belong to different 160MHz segments) | 1 | 2xRU996 of allocated RU |
| | 2 | RU484 of allocated RU+ one of two RU996 of allocated RU which belongs to the same 160MHz segment as RU484 of allocated RU |
| | 3-15 | reserved |

Fig. 9B

| Allocated RU or RU Combination Larger than 242 Tones | B3B2B1B0 of the Adapted RU Allocation field | Adapted RU |
|---|---|---|
| | 0 | Allocated RU |
| | 1 | 1st and 2nd RU996 of allocated RU |
| | 2 | 2nd and 3rd RU996 of allocated RU |
| | 3 | 1st and 3rd RU996 of allocated RU |
| | 4 | 1st RU484 within 1st RU996 of allocated RU+2nd RU996 +3rd RU99 of allocated RU |
| | 5 | 2nd RU484 within 1st RU996 of allocated RU+2nd RU996 +3rd RU996 of allocated RU |
| | 6 | 1st RU484 within 2nd RU996 of allocated RU+1st RU996 +3rd RU996 of allocated RU |
| | 7 | 2nd RU484 within 2nd RU996 of allocated RU+1st RU996+3rd RU996 of allocated RU |
| | 8 | 1st RU484 within 3rd RU996 of allocated RU+1st RU996 +2nd RU996 of allocated RU |
| | 9 | 2nd RU484 within 3rd RU996 of allocated RU+1st RU996+2nd RU996 of allocated RU |
| 3xRU996 | 10-15 | reserved |
| | 0 | Allocated RU |
| | 1 | 3xRU996 of allocated RU |
| | 2 | 1st and 2nd RU996 of allocated RU |
| | 3 | 2nd and 3rd RU996 of allocated RU |
| | 4 | 1st and 3rd RU996 of allocated RU |
| | 5 | 1st RU484 within 1st RU996 of allocated RU+2nd RU996 +3rd RU99 of allocated RU |
| | 6 | 2nd RU484 within 1st RU996 of allocated RU+2nd RU996 +3rd RU996 of allocated RU |
| | 7 | 1st RU484 within 2nd RU996 of allocated RU+1st RU996 +3rd RU996 of allocated RU |
| | 8 | 2nd RU484 within 2nd RU996 of allocated RU+1st RU996+3rd RU996 of allocated RU |
| | 9 | 1st RU484 within 3rd RU996 of allocated RU+1st RU996 +2nd RU996 of allocated RU |
| | 10 | 2nd RU484 within 3rd RU996 of allocated RU+1st RU996+2nd RU996 of allocated RU |
| | 11 | RU484+1st RU996+2nd RU996 of allocated RU |
| | 12 | RU484+1st RU996+3rd RU996 of allocated RU |
| | 13 | RU484+2nd RU996+3rd RU996 of allocated RU |
| RU484+3xRU996 | 14-15 | reserved |

Fig. 9C

| Allocated RU or RU Combination Larger than 242 Tones | Associated RU or RU Combinations | Number of Blind Decoding required |
|---|---|---|
| RU484 | RU484, RU242 (two options) | 3 |
| RU242+RU484 | RU242+RU484, RU484 | 2 |
| RU996 | RU996, RU242+RU484 (4 options), RU484 (2 options) | 7 |
| RU484+RU996 | RU484+RU996, RU996, RU484+RU242 (4 options) | 6 |
| 2×RU996 | 2×RU996, RU484+RU996 (4 options if two RU996 belong to a same 160MHz segment or 0 if two RU996 belong to different 160MHz segment), RU996 (2 options) | 7 or 3 |
| RU484+2×RU996 | RU484+2×RU996, 2×RU996, RU484+RU996 (4 options if two RU966 belong to a same 160MHz segment or 1 option if two RU966 belong to different 160MHz segments) | 6 or 3 |
| 3×RU996 | 3×RU996, 2×RU996 (3 options), RU484+2×RU996 (6 options) | 10 |
| RU484+3×RU996 | RU484+3×RU996, 3×RU996, 2×RU996 (3 options), RU484+2×RU996 (9 options) | 14 |
| 4×RU996 (for UL MU-MIMO only) | 4×RU996, RU484+3×RU996 (6 options), 3×RU996 (3 options) | 10 |

1400

Fig. 14

COMMUNICATION APPARATUS AND COMMUNICATION METHOD FOR TRIGGER-BASED UPLINK MULTIUSER TRANSMISSION

TECHNICAL FIELD

The present disclosure relates to communication apparatuses and methods for uplink multiuser transmission, and more particularly to communication apparatuses and methods for trigger-based uplink multiuser transmission.

BACKGROUND

In the standardization of next generation wireless local area network (WLAN), a new radio access technology having backward compatibilities with IEEE 802.11a/b/g/n/ac/ax technologies has been discussed in the IEEE 802.11 Working Group and is named 802.11be Extremely High Throughput (EHT) WLAN.

In IEEE 802.11be EHT WLAN, in order to improve spectral efficiency over 11ax High Efficiency (HE) WLAN, it has proposed to increase maximum channel bandwidth to 320 MHz and allow more than one resource units (RUs) to be allocated to a single station (STA).

However, there is no much discussion on efficient trigger-based uplink multiuser transmission with a bandwidth up to 320 MHz.

There is thus a need for communication apparatuses and methods that provide feasible technical solutions for efficient trigger-based uplink multiuser transmission with a bandwidth up to 320 MHz. Furthermore, other desirable features and characteristics will become apparent from the subsequent detailed description and the appended claims, taken in conjunction with the accompanying drawings and this background of the disclosure.

SUMMARY

Non-limiting and exemplary embodiments facilitate providing communication apparatuses and communication methods for efficient trigger-based uplink multiuser transmission.

According to a first aspect, the present disclosure refers to a communication apparatus comprising: circuitry, which in operation, generates a trigger frame comprising a common info field and a plurality of user info fields; and a transmitter, which in operation, transmits the generated trigger frame; wherein each of the plurality of user info fields comprises a first field which indicates whether a resource unit (RU) adaptation procedure is disabled for another communication apparatus addressed by the each of the plurality of user info field and a second field which indicates a RU or RU combination allocated to the another communication apparatus.

According to a second aspect, the present disclosure refers to a communication method comprising: generating a trigger frame comprising a common info field and a plurality of user info fields; and transmitting the generated trigger frame; wherein each of the plurality of user info fields comprises a first field which indicates whether a RU adaptation procedure is disabled for a communication apparatus addressed by the each of the plurality of user info field and a second field which indicates a RU or RU combination allocated to the communication apparatus.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

Embodiments of the disclosure will be better understood and readily apparent to one of ordinary skilled in the art from the following written description, by way of example only, and in conjunction with the drawings, in which:

FIG. 1D shows a table of fields carried in a U-SIG field of an EHT TB PPDU.

FIG. 3 shows a table illustrating RU or RU combination larger than 242 tones and associated RU or RU combinations according to various embodiments.

FIG. 8 shows a table of fields carried in a U-SIG field of an EHT TB PPDU transmitted by a STA with RU Adaptation Disabled field in the STA's User Info field of soliciting EHT Basic trigger frame set to 0 under an Option A according to a second embodiment.

FIGS. 9A-9C show a table illustrating how allocated RU or RU combination larger than 242 tones and Adapted RU Allocation field indicate an adapted RU or RU combination under Option A according to a second embodiment.

FIG. 14 shows a table illustrating number of blind decoding required for each of allocated RU or RU combinations larger than 242 tones according to a third embodiment.

Figure 1A:
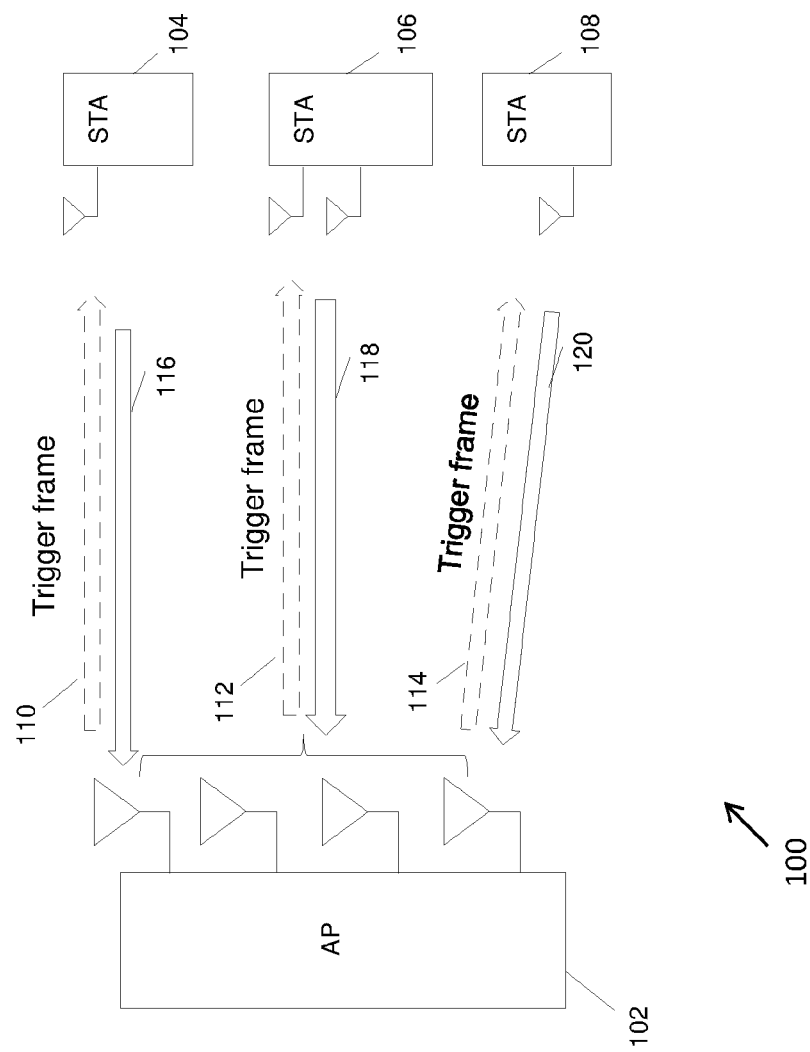
FIG. 1A depicts a schematic diagram of trigger-based uplink multiuser (MU) communication between an AP and multiple STAs in a MIMO wireless network.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help an accurate understanding of the present embodiments.

DETAILED DESCRIPTION

Some embodiments of the present disclosure will be described, by way of example only, with reference to the drawings. Like reference numerals and characters in the drawings refer to like elements or equivalents.

In the following paragraphs, certain exemplifying embodiments are explained with reference to an access point (AP) and a station (STA) for uplink multiuser transmission, especially in a multiple-input multiple-output (MIMO) wireless network.

In the context of IEEE 802.11 (Wi-Fi) technologies, a station, which is interchangeably referred to as a STA, is a communication apparatus that has the capability to use the 802.11 protocol. Based on the IEEE 802.11-2016 definition, a STA can be any device that contains an IEEE 802.11-conformant media access control (MAC) and physical layer (PHY) interface to the wireless medium (WM).

For example, a STA may be a laptop, a desktop personal computer (PC), a personal digital assistant (PDA), an access point or a Wi-Fi phone in a wireless local area network (WLAN) environment. The STA may be fixed or mobile. In the WLAN environment, the terms "STA", "wireless client", "user", "user device", and "node" are often used interchangeably.

Likewise, an AP, which may be interchangeably referred to as a wireless access point (WAP) in the context of IEEE 802.11 (Wi-Fi) technologies, is a communication apparatus that allows STAs in a WLAN to connect to a wired network. The AP usually connects to a router (via a wired network) as a standalone device, but it can also be integrated with or employed in the router.

As mentioned above, a STA in a WLAN may work as an AP at a different occasion, and vice versa. This is because communication apparatuses in the context of IEEE 802.11 (Wi-Fi) technologies may include both STA hardware components and AP hardware components. In this manner, the communication apparatuses may switch between a STA mode and an AP mode, based on actual WLAN conditions and/or requirements.

In a MIMO wireless network, "multiple" refers to multiple antennas used simultaneously for transmission and multiple antennas used simultaneously for reception, over a radio channel. In this regard, "multiple-input" refers to multiple transmitter antennas, which input a radio signal into the channel, and "multiple-output" refers to multiple receiver antennas, which receive the radio signal from the channel and into the receiver. For example, in an N×M MIMO network system, N is the number of transmitter antennas, M is the number of receiver antennas, and N may or may not be equal to M. For the sake of simplicity, the respective numbers of transmitter antennas and receiver antennas are not discussed further in the present disclosure.

In a MIMO wireless network, multi-user (MU) communications can be deployed for communications between communication apparatuses such as APs and STAs. MIMO wireless network has benefits like spatial multiplexing and spatial diversity, which enable higher data rates and robustness through the use of multiple spatial streams. According to various embodiments, the term "spatial stream" may be used interchangeably with the term "space-time stream" (or STS).

To enable uplink MU transmissions, trigger-based communication is provided to the MIMO wireless network. In this regard, FIG. 1A depicts a schematic diagram 100 of trigger-based uplink MU communication between an AP 102 and multiple STAs 104, 106, 108 in a MIMO wireless network.

Since there are multiple STAs 104, 106, 108 participating in the trigger-based uplink MU communication, the AP 102 needs to coordinate simultaneous transmissions of multiple STAs 104, 106, 108.

To do so, as shown in FIG. 1A, the AP 102 transmits trigger frames 110, 112, 114 simultaneously to STAs 104, 106, 108 to indicate user-specific resource allocation information (e.g. the number of space-time streams, a starting STS number and the allocated RUs) each STA can use. In response to the trigger frames, STAs 104, 106 108 may then transmit their respective space-time streams simultaneously to the AP 102 according to the user-specific resource allocation information indicated in the trigger frames 110, 112, 114. For example, two space-time streams may be directed to the AP 102 from STA 106, another space-time stream may be directed to the AP 102 from STA 104, and yet another space-time stream may be directed to the AP 102 from STA 108. For the sake of simplicity, the two space-time streams directed to the AP 102 from STA 106 are illustrated as a grouped data transmission arrow 118, the space-time stream directed to the AP 102 from STA 104 is illustrated as a data transmission arrow 116, and the space-time stream directed to the AP 102 from STA 108 is illustrated as a data transmission arrow 120.

Figure 1B:
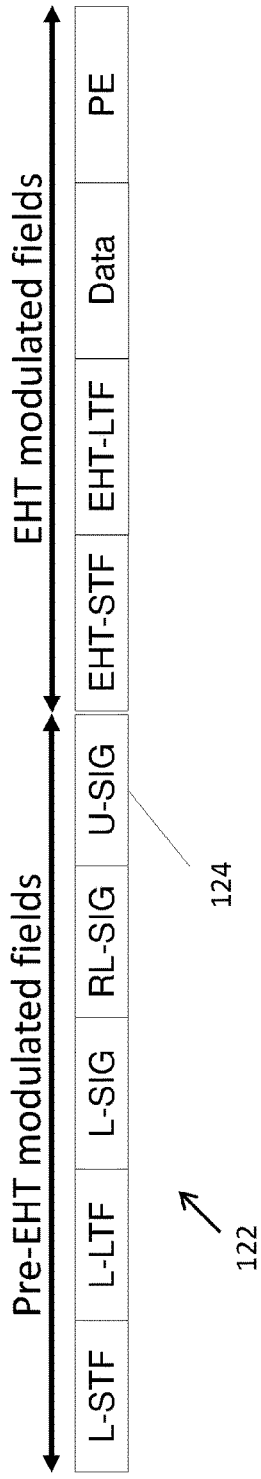
FIG. 1B shows an exemplary EHT trigger-based (TB) physical layer protocol data unit (PPDU).

FIG. 1B shows an exemplary EHT trigger-based (TB) physical layer protocol data unit (PPDU) 122 which may be transmitted as a transmission signal by a communication apparatus (such as a STA) to another communication apparatus (such as an AP) in a trigger-based communication. The EHT TB PPDU 122 may comprise pre-EHT modulated fields such as a non-High Throughput Short Training Field (L-STF), a non-High Throughput Long Training Field (L-LTF), a non-High Throughput SIGNAL (L-SIG) field, a Repeated L-SIG (RL-SIG) field and a Universal SIGNAL (U-SIG) field 124, as well as EHT modulated fields such as an EHT Short Training Field (EHT-STF), an EHT Long Training Field (EHT-LTF), a data field and a Packet Extension (PE) field. The RL-SIG field is mainly used for identifying any PHY versions starting with 802.11be. The U-SIG field 124 may contain the necessary information for interpreting the EHT modulated fields and for coexisting with third-party STAs.

Figure 1C:
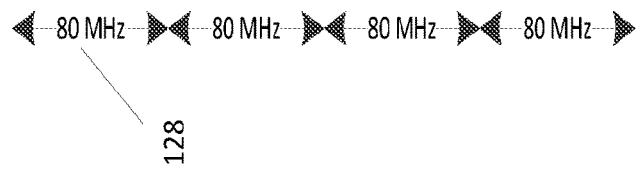
FIG. 1C shows a diagram illustrating how pre-EHT modulated fields of an EHT TB PPDU with a bandwidth of 320 MHz may be transmitted.

FIG. 1C shows a diagram 126 illustrating how pre-EHT modulated fields of an EHT TB PPDU with a bandwidth of 320 MHz may be transmitted. The bandwidth of 320 MHz is divided into four frequency segments of 80 MHz. Further, each 80 MHz frequency segment is also divided into four 20 MHz frequency segments. Each row in diagram 126 represents a 20 MHz frequency segment in which the pre-EHT modulated fields (i.e. L-STF, L-LTF, L-SIG field, RL-SIG field and U-SIG field) of the EHT TB PPDU 122 are transmitted. The transmitted L-SIG field and RL-SIG field may be the same for all of 20 MHz frequency segments but the U-SIG field may differ among the 80 MHz frequency segments. The U-SIG field transmitted in each of the four 20 MHz frequency segment of an 80 MHz frequency segment may be duplicate of or different from each other. For example, U-SIG11, U-SIG12, U-SIG13 and U-SIG14 transmitted in the 20 MHz frequency segments of the same 80 MHz frequency segment 128 may be duplicate of or different from each other. According to various embodiments, the term "frequency segment" may be used interchangeably with the term "subchannel".

The U-SIG field of an EHT TB PPDU is two orthogonal frequency division multiplexing (OFDM) symbols long and jointly encoded. The U-SIG field is sent using 52 data tones and 4 pilot tones per 20 MHz and modulated in the same way as the HE-SIG-A field of 802.11ax.

FIG. 1D shows a table 130 of fields carried in a U-SIG field of an EHT TB PPDU. As shown in table 130, a U-SIG field may comprise a 26-bit U-SIG1 and a 26-bit U-SIG2. The U-SIG1 may comprise a PHY Version Identifier field (3 bits), an Uplink/Downlink (UL/DL) Flag field (1 bit), a Basic Service Set (BSS) Color field (6 bits), a Transmission Opportunity (TXOP) Duration field (7 bits), a Bandwidth (BW) field (3 bits) and a Puncturing Channel Info field (4 bits). U-SIG2 may comprise a Spatial Reuse 1 field (4 bits), a Spatial Reuse 2 field (4 bits), a Reserved field (8 bits), a cyclic redundancy check (CRC) field (4 bits) and tail bits (6 bits). The PHY Version Identifier field is used to identify the exact PHY version starting with 802.11be, the BW field is used to indicate PPDU bandwidth and the Puncturing Channel Info field is used to indicate the puncturing channel information.

In an 802.11ax-like trigger-based UL MU transmission, if requested in a trigger frame (e.g. EHT Basic Trigger frame) soliciting an UL MU transmission, energy detection (ED)-based clear channel assessment (CCA) shall be performed by a STA on 20 MHz subchannels overlapping with a RU or RU combination allocated to the STA. If any of the 20 MHz subchannels is considered to be busy, the STA that received the EHT Basic Trigger frame does not transmit an EHT TB PPDU.

Figure 2:
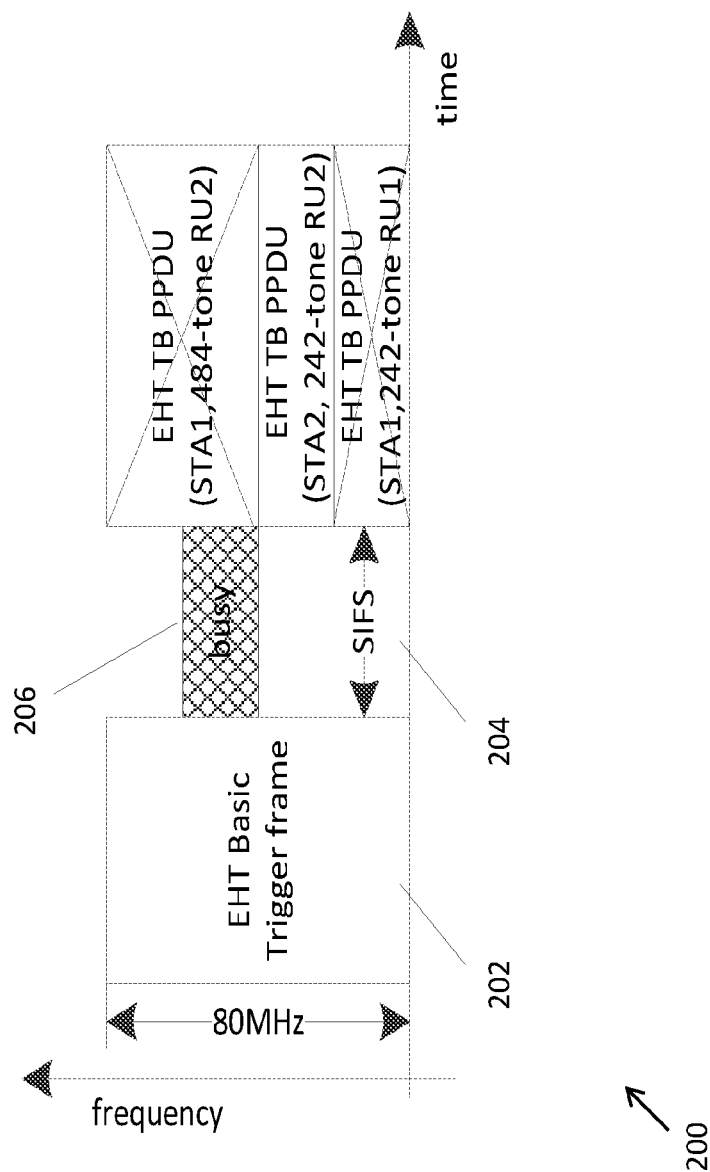
FIG. 2 shows an illustration of an 802.11ax-like trigger-based uplink MU transmission.

FIG. 2 shows an illustration 200 of an 802.11ax-like trigger-based UL MU transmission. An AP may transmit an EHT Basic Trigger frame 202 to solicit simultaneous EHT TB PPDU transmissions from STA1 and STA2 with a bandwidth of 80 MHz. The EHT Basic Trigger frame 202 indicates a large-size RU combination of the 484-tone RU2 and the 242-tone RU1 is allocated to STA1 and a large-size RU of the 242-tone RU2 is allocated to STA2. Generally, RUs with equal to or more than 242 tones may be defined as large-size RUs, while RUs with less than 242 tones may be defined as small-size RUs. The EHT Basic Trigger frame 202 also indicates ED-based CCA needs to be performed by STA1 and STA2 during a short interframe space (SIFS) 204 immediately after receiving the EHT Basic Trigger frame 202. Based on the CCA results, it is determined that a 20 MHz subchannel 206 overlapping with the allocated RU combination for STA1 is considered to be busy while the 20 MHz subchannel overlapping with the allocated RU for STA2 is considered to be idle. Thus, only STA2 can transmit an EHT TB PPDU at the allocated RU while STA1 cannot transmit an EHT TB PPDU. As a result, whole large-size RU or RU combination allocated to a STA may be wasted even if only a small number of 20 MHz subchannels overlapping with the allocated large-size RU or RU combination is considered to be busy, which would degrade system throughput.

Accordingly, the present disclosure proposes the following solution for solving the above-mentioned problem. Each RU or RU combination larger than 242 tones is associated with two or more RUs or RU combinations. Each of two or more RUs or RU combinations associated with a RU or RU combination larger than 242 tones is a large-size RU or RU combination which is allowed for EHT WLAN. Each of two or more RUs or RU combinations associated with a RU or RU combination larger than 242 tones has a size not larger than the RU or RU combination. For reducing the number of RUs or RU combinations associated with a RU or RU combination, some restrictions may be enforced. For example, each of RU or RU combinations associated with a RU or RU combination not larger than 2*996 tones has a size of at least X % (e.g. X=50) of the size of the RU or RU combination. Further, each of RU or RU combinations associated with a RU or RU combination larger than 2*996 tones has a size of more than X % (e.g. X=50) of the size of the RU or RU combination.

Example RU or RU combinations associated with each RU or RU combination larger than 242 tones (where X=50) in accordance with various embodiments are as shown in table 300 of FIG. 3. For example, referring to 484-tone RU (RU484) which is applicable to a PPDU BW of 40 MHz, 80 MHz, 160/80+80 MHz and 320/160+160 MHz, the associated RUs or RU combinations are the RU484 and 242-tone RU (RU242). For the RU242, there can be two options of being either a first RU242 or a second RU242 of the RU484. Referring to a combination of one RU242 and one RU484 (RU242+RU484) which is applicable to a PPDU BW of 80 MHz, 160/80+80 MHz and 320/160+160 MHz, the associated RUs or RU combinations are the RU242+RU484 and the RU484 of the RU242+RU484. As can be seen in the table 300, RU242+RU484 is allowed only within a same 80 MHz frequency segment, while RU484+RU996 is allowed only within a same 160 MHz frequency segment.

Figure 4:
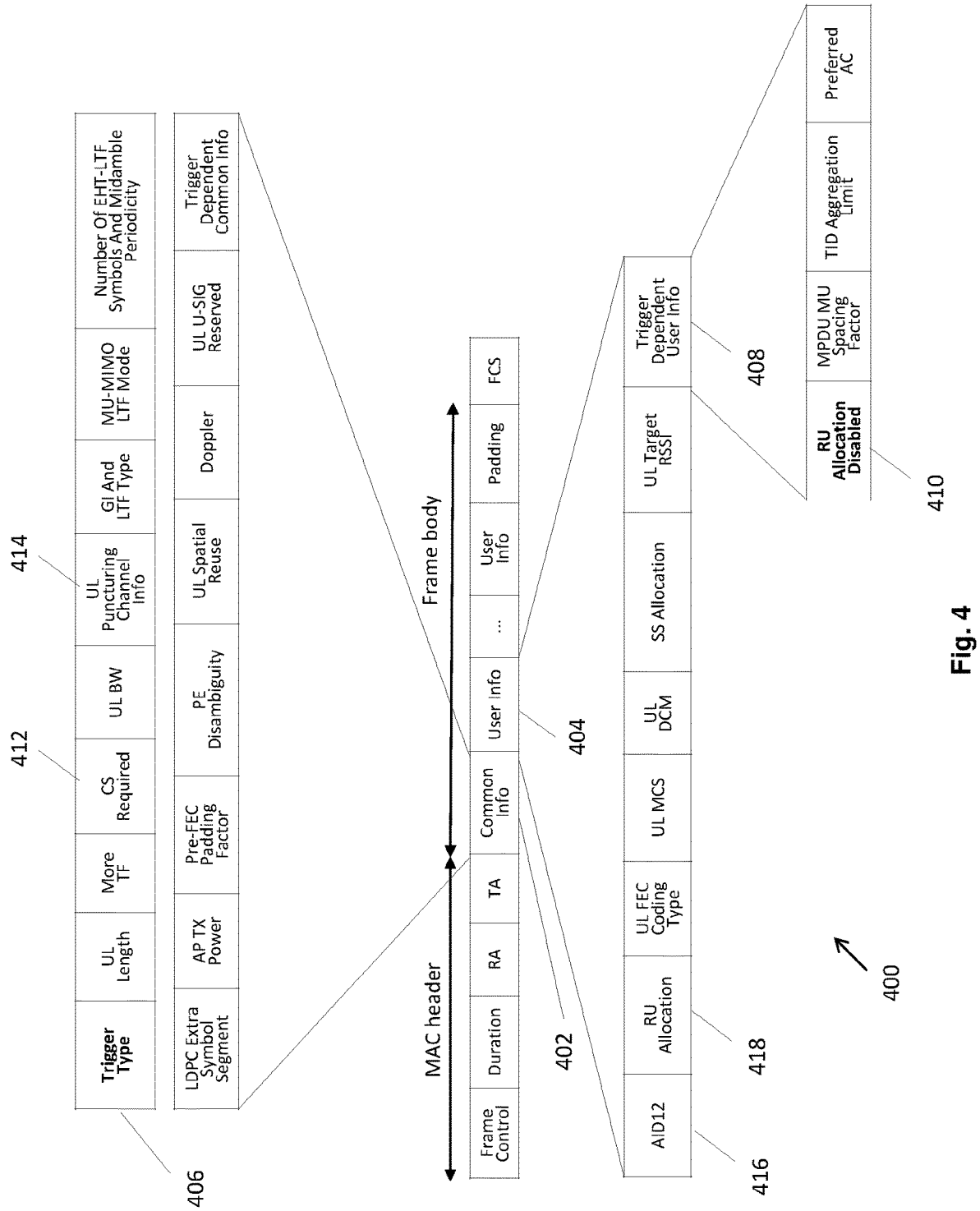
FIG. 4 shows a format of an EHT Basic Trigger frame according to various embodiments.

FIG. 4 shows a format of an EHT Basic Trigger frame 400 according to various embodiments. The EHT Basic Trigger frame 400 may comprise a Common Info field 402 and one or more User Info field 404. A Trigger Type field 406 in the Common Info field 402 indicates that the frame 400 is an EHT Basic Trigger frame. Each of the one or more User Info field 404 may comprise a RU Allocation field 418 which indicates a RU or RU combination allocated to a STA indicated in an AID12 field 416. Each of the one or more User Info field 404 may comprise a Trigger Dependent User Info field 408 which includes a RU Allocation Disabled field 410. The RU Adaptation Disabled field 410 indicates whether a RU adaptation procedure is disabled for the STA. When the RU Adaptation Disabled field 410 is set to 1, the RU adaptation procedure is disabled for the STA. When the RU Adaptation Disabled field 410 is set to 0, RU adaptation is enabled for the STA. Further, when the allocated RU or RU combination for the STA is not larger than 242 tones, the RU Adaptation Disabled field 410 shall be set to 1.

The Common Info field 402 may also comprise a carrier sensing (CS) Required field 412 which indicates whether ED-based CCA is required by each scheduled STA prior to EHT TB PPDU transmission. The Common Info field 402 may also comprise a UL Puncturing Channel Info field 414 which may comprise N subfields, each of which indicates uplink puncturing channel information within a corresponding 80 MHz frequency segment. For example, N=0 when UL BW=20 or 40 MHz, N=1 when UL BW=80 MHz, N=2 when UL BW=160/80+80 MHz, and N=4 when UL BW=320/160+160 MHz. Each of N UL Puncturing Channel Info subfields may be a 4-bit bitmap, wherein a bit set to 1 indicates the corresponding 20 MHz subchannel is punctured; and set to 0 if otherwise.

According to various embodiments, a STA may perform a RU adaptation procedure when the RU Adaptation Disabled field of the STA's User Info field in a soliciting EHT Basic Trigger frame is set to 0. The RU or RU combination allocated to the STA may be adapted to one of its associated RUs or RU combinations according to results of ED-based CCA performed by the STA. When part of the allocated RU or RU combination which is considered to be idle matches one of its associated RUs or RU combinations, the allocated RU or RU combination is adapted to be the one of its associated RUs or RU combinations. When part of the allocated RU or RU combination which is considered to be idle does not match any of its associated RUs or RU combinations but covers at least one of its associated RUs or RU combinations, the allocated RU or RU combination is adapted to be one of its associated RUs or RU combinations which overlaps with the part of the allocated RU or RU combination to the most extent. Further, when part of the allocated RU or RU combination which is considered to be idle does not match or cover any of its associated RUs or RU combinations, the allocated RU or RU combination is not adapted to any of its associated RUs or RU combinations.

Figure 5:
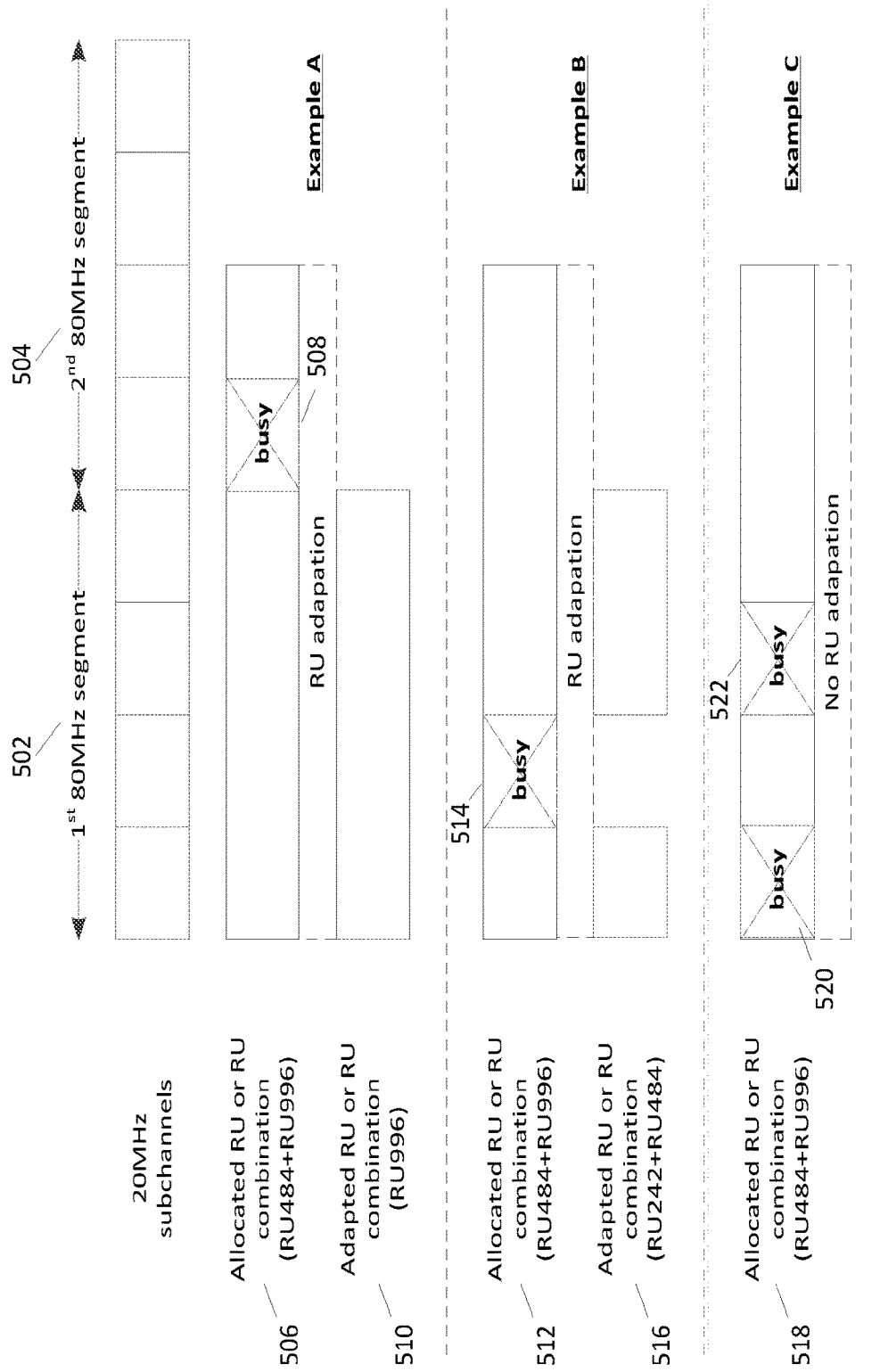
FIG. 5 shows an illustration of how RU adaptation is achieved according to various embodiments.

FIG. 5 shows an illustration 500 of how RU adaptation is achieved by a STA according to various embodiments. In this illustration, a combination of the $3^{rd}$ RU484 and the $1^{st}$ RU996 (RU484+RU996) 506, 512, 518 is allocated to the STA for EHT TB PPDU transmission with a BW of 160 MHz which comprises a first 80 MHz frequency segment 502 and a second 80 MHz frequency segment 504. In an example A, a 20 MHz subchannel 508 overlapping with the allocated RU combination 506 is considered to be busy based on ED-based CCA results performed by the STA. Therefore, the allocated RU combination 506 is adapted to one of its associated RUs or RU combinations, i.e. adapted RU (the $1^{st}$ RU996) 510. In an example B, a 20 MHz subchannel 514 overlapping with the allocated RU combination 512 is considered to be busy based on ED-based CCA results performed by the STA. Therefore, the allocated RU combination 512 is adapted to one of its associated RUs or RU combinations, i.e. adapted RU combination (the $1^{st}$ RU242 and the $2^{nd}$ RU484) 516. In an example C, 20 MHz subchannels 520 and 522 overlapping with the allocated RU combination 518 are considered to be busy based on ED-based CCA results performed by the STA. In this case, part of the allocated RU combination 518 which is considered to be idle does not match or cover any of its associated RUs or RU combinations. Therefore, the allocated RU combination 518 is not adapted to any of its associated RUs or RU combinations.

According to a first embodiment, STA behaviour for implementing EHT TB PPDU transmission is as follows. When a RU adaptation procedure is not performed by a STA, an 802.11ax-like EHT TB PPDU transmission procedure is carried out by the STA. When a RU adaptation procedure is performed by a STA and the allocated RU or RU combination for the STA is adapted to one of its associated RUs or RU combinations according to results of ED-based CCA performed by the STA, the STA prepares an EHT TB PPDU according to the adapted RU or RU combination as well as common transmission parameters and other user-specific transmission parameters (excluding the allocated RU or RU combination) indicated in the Common Info field and the STA's User Info field of a soliciting EHT Basic Trigger frame. Further, the Puncturing Channel Info field of U-SIG field in the EHT TB PPDU is set according to the UL Puncturing Channel Info field of the Common Info field in the soliciting EHT Basic Trigger frame. For example, the value of Puncturing Channel Info field of U-SIG transmitted in an 80 MHz frequency segment is set to the same as the value of the UL Puncturing Channel Info subfield of the soliciting EHT Basic Trigger frame corresponding to the 80 MHz frequency segment.

On the other hand, when a RU adaptation procedure is performed by a STA and the allocated RU or RU combination for a STA is not adapted to any of its associated RUs or RU combinations according to results of ED-based CCA performed by the STA, the STA does not transmit an EHT TB PPDU. Advantageously, throughput of trigger-based UL MU transmission can be improved.

Figure 6:
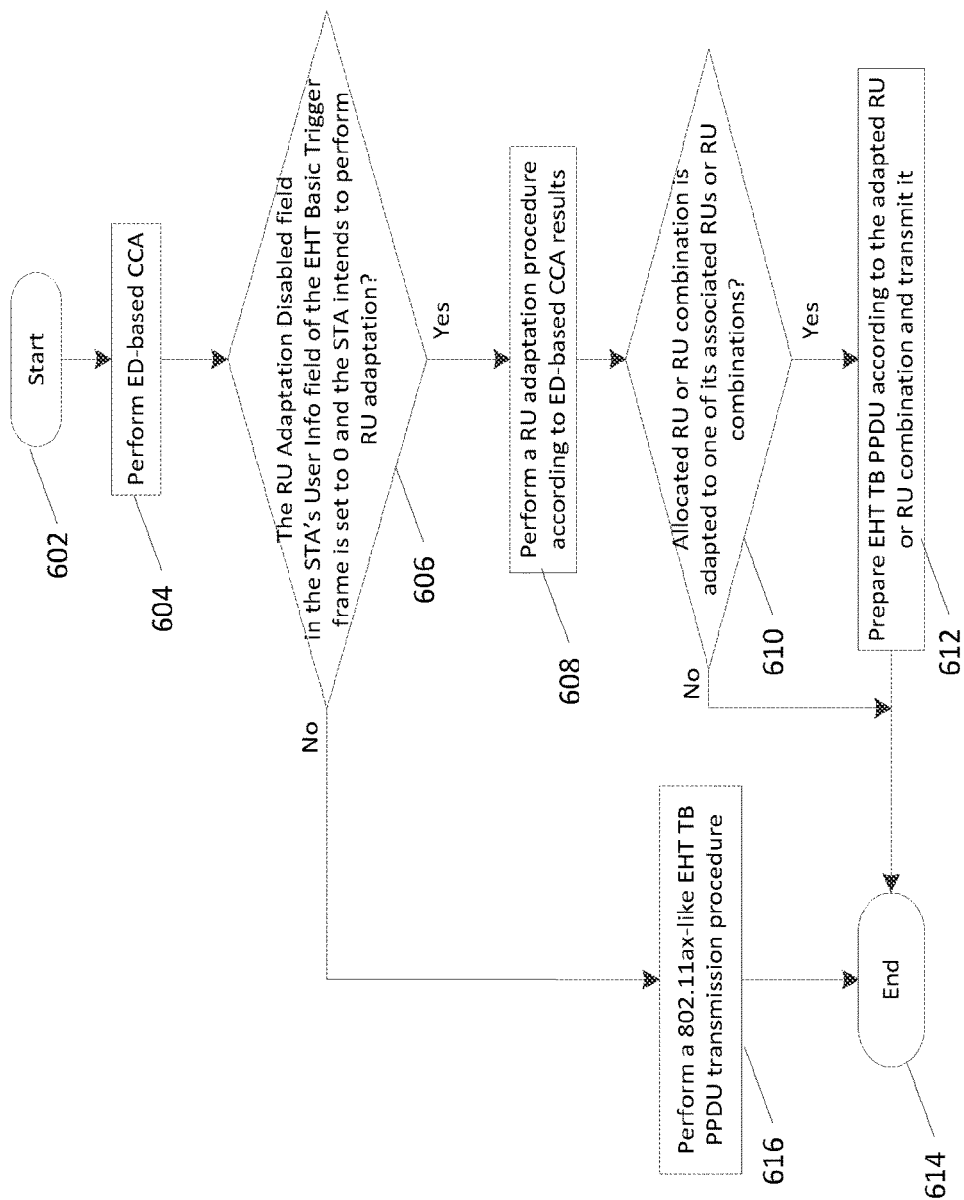
FIG. 6 depicts a flow diagram illustrating an EHT TB PPDU transmission procedure according to a first embodiment.

An EHT TB PPDU transmission procedure performed by a STA when receiving an EHT Basic Trigger frame requesting the STA to perform ED-based CCA before EHT TB PPDU transmission according to the first embodiment is illustrated in flow diagram 600 of FIG. 6. The process begins at step 602. At step 604, ED-based CCA is performed by the non-AP STA. At step 606, it is determined whether the RU Adaptation Disabled field in the STA's User Info field of the EHT Basic Trigger frame is set to 0 and the STA intends to perform a RU adaptation procedure. If it is determined that this is not the case, the process proceeds to step 616 where an 802.11ax-like EHT TB PPDU transmission procedure is performed, and then the process ends at step 614. On the other hand, if it is determined at step 606 that the RU Adaptation Disabled field in the STA's User Info field of the EHT Basic Trigger frame is set to 0 and the STA intends to perform a RU adaptation procedure, the process proceeds to step 608 where a RU adaptation procedure is performed according to ED-based CCA results. At step 610, it is determined whether an allocated RU or RU combination is adapted to one of its associated RUs or RU combinations. If it is determined that this is not the case, the process ends at step 614. Otherwise, the process proceeds to step 612 wherein an EHT TB PPDU is prepared according to the adapted RU or RU combination and then transmitted. The process then ends at step 614.

According to the first embodiment, AP behaviour for implementing EHT TB PPDU reception is as follows. When the allocated RU or RU combination for the STA is for a Multiuser Multiple Input Multiple Output (MU-MIMO) allocation, the RU Adaptation Disabled field shall also be set to 1. When receiving an EHT TB PPDU transmitted by a STA with RU adaptation disabled, the AP decodes the EHT TB PPDU according to the allocated RU or RU combination using an 802.11ax-like EHT TB PPDU reception procedure. When receiving an EHT TB PPDU transmitted by a STA with RU adaptation enabled, the AP decodes the EHT TB PPDU according to the following procedure: signal detection is performed using one or more of pre-EHT modulated fields of the EHT TB PPDU (i.e. L-STF, L-LTF, L-SIG field, RL-SIG field and U-SIG field) transmitted in all 20 MHz subchannels corresponding to the allocated RU or RU combination for the STA. Based on signal detection results, the STA is able to determine the adapted RU or RU combination. BSS color indicated in the U-SIG field can be used to exclude overlapping basic service set (OBSS) transmission so that the adapted RU or RU combination can be determined properly. The remaining EHT TB PPDU is then decoded by the AP according to the adapted RU or RU combination. For an example A illustrated in FIG. 5 where a RU combination of the $1^{st}$ RU996 and the $3^{rd}$ RU484 allocated to a STA is adapted to the $1^{st}$ RU996. When an AP receives an EHT TB PPDU transmitted by the STA, signal would be detected by the AP in all four 20 MHz subchannels corresponding to the $1^{st}$ RU996 and thus the AP is able to determine the adapted RU is the $1^{st}$ RU996.

Figure 7:
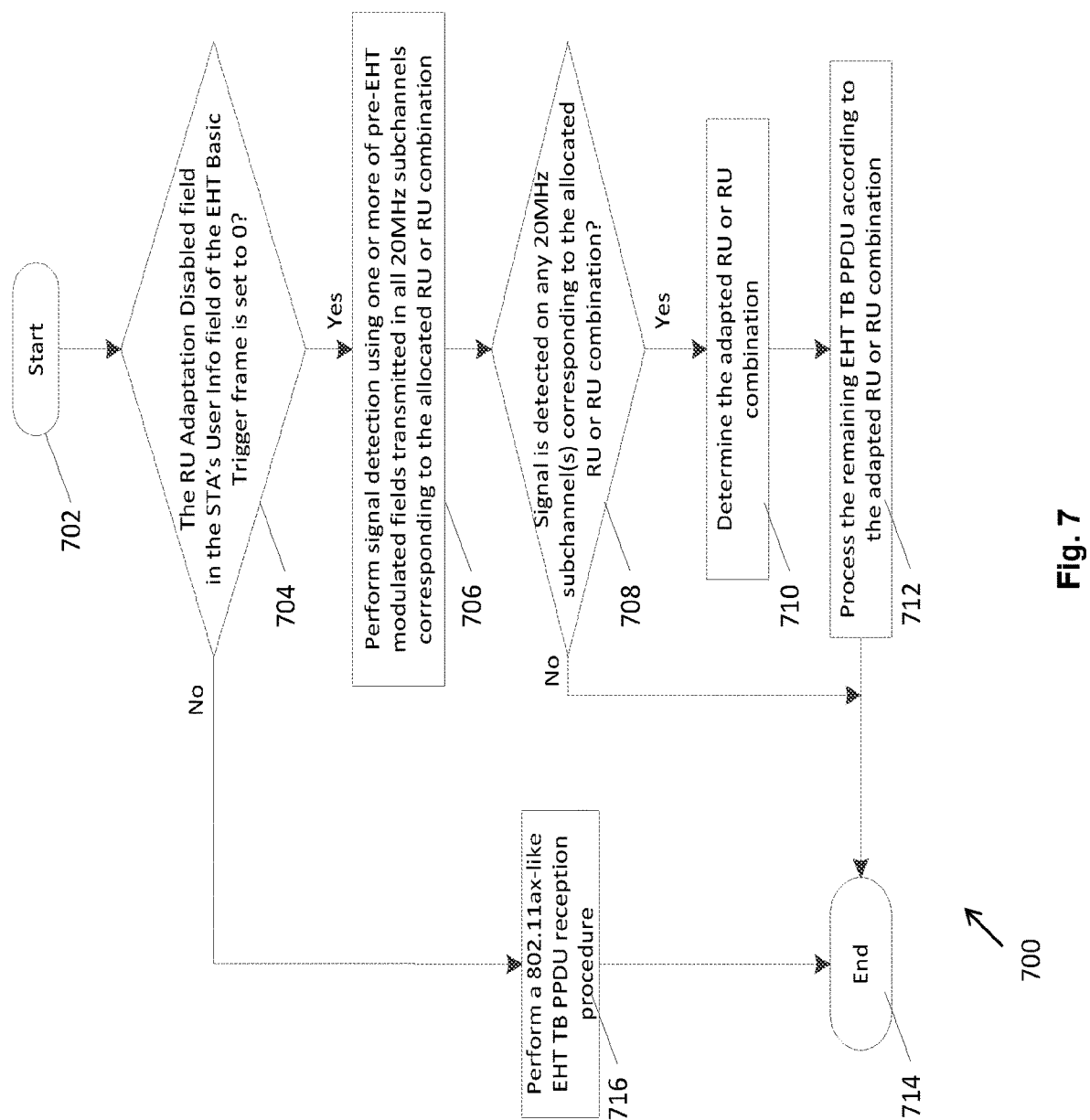
FIG. 7 depicts a flow diagram illustrating an EHT TB PPDU reception procedure according to a first embodiment.

An EHT TB PPDU reception procedure performed by an AP when an STA is requested to perform ED-based CCA before EHT TB PPDU transmission according to the first embodiment is illustrated in flow diagram 700 of FIG. 7. The process begins at step 702. At step 704, it is determined whether the RU Adaptation Disabled field in the STA's User Info field of the soliciting EHT Basic Trigger frame is set to 0. If it is determined that this is not the case, the process proceeds to step 716 where an 802.11ax-like EHT TB PPDU reception procedure is performed, and then the process ends at step 714. On the other hand, if it is determined at step 704 that the RU Adaptation Disabled field in the STA's User Info field of the soliciting EHT Basic Trigger frame is set to 0, the process proceeds to step 706 where signal detection using one or more of pre-EHT modulated fields of the EHT TB PPDU transmitted in all 20 MHz subchannels corresponding to the allocation RU or RU combination is performed. At step 708, it is determined whether a signal is detected on any 20 MHz subchannels corresponding to the allocated RU or RU combination. If it is determined that this is not the case, the process ends at step 714. Otherwise, the process proceeds to step 710 wherein the adapted RU or RU combination is determined. At step 712, the remaining EHT TB PPDU is processed according to the adapted RU or RU combination. The process then ends at step 714.

According to a second embodiment, STA behaviour for implementing EHT TB PPDU transmission is as follows. When a RU adaptation procedure is performed by a STA and the allocated RU or RU combination for the STA is adapted to one of its associated RUs or RU combinations according to results of ED-based CCA performed by the STA, the STA prepares an EHT TB PPDU according to the adapted RU or RU combination as well as common transmission parameters and other user-specific transmission parameters (excluding the allocated RU or RU combination) indicated in the Common Info field and the STA's User Info field of the soliciting EHT Basic Trigger frame.

The process may then proceed in one of two options. In an Option A, the Puncturing Channel Info field of U-SIG field of EHT TB PPDU is set according to the UL Puncturing Channel Info field of the soliciting EHT Basic Trigger frame. For example, the value of Puncturing Channel Info field of U-SIG transmitted in an 80 MHz frequency segment is set to the same as the value of the UL Puncturing Channel Info subfield of soliciting EHT Basic Trigger frame corresponding to the 80 MHz frequency segment. The U-SIG field of the EHT TB PPDU contains an Adapted RU Allocation field which indicates the adapted RU or RU combination. In an Option B, Puncturing Channel Info fields of U-SIG fields of EHT TB PPDU are set according to the UL Puncturing Channel Info field of the soliciting EHT Basic Trigger frame and the adapted RU or RU combination.

FIG. 8 shows a table 800 of fields carried in the U-SIG field of an EHT TB PPDU transmitted by a STA with the RU Adaptation Disabled field in the STA's User Info field of soliciting EHT Basic trigger frame set to 0 under an Option A according to the second embodiment. As seen in the table 800, U-SIG2 of the U-SIG field includes an Adapted RU Allocation field 802. As explained above, the Adapted RU Allocation field 802 indicates the adapted RU or RU combination.

FIGS. 9A-9C show a table 900 illustrating how allocated RU or RU combination larger than 242 tones and Adapted RU Allocation field indicate an adapted RU or RU combination under Option A according to the second embodiment.

For example, in a case when allocated RU or RU combination larger than 242 tones is RU484:
when the Adapted RU Allocation field indicates a value of 0, the adapted RU is the allocated RU (i.e. RU484);
when the Adapted RU Allocation field indicates a value of 1, the adapted RU is the $1^{st}$ RU242 within the allocated RU;
when the Adapted RU Allocation field indicates a value of 2, the adapted RU is the $2^{nd}$ RU242 within the allocated RU; and
values of 3-15 are reserved.

Further, in a case when allocated RU or RU combination larger than 242 tones is RU242+RU484:
when the Adapted RU Allocation field indicates a value of 0, the adapted RU is the allocated RU (i.e. RU242+ RU484);
when the Adapted RU Allocation field indicates a value of 1, the adapted RU is the RU484 of the allocated RU; and
values of 2-15 are reserved.

Figure 10:
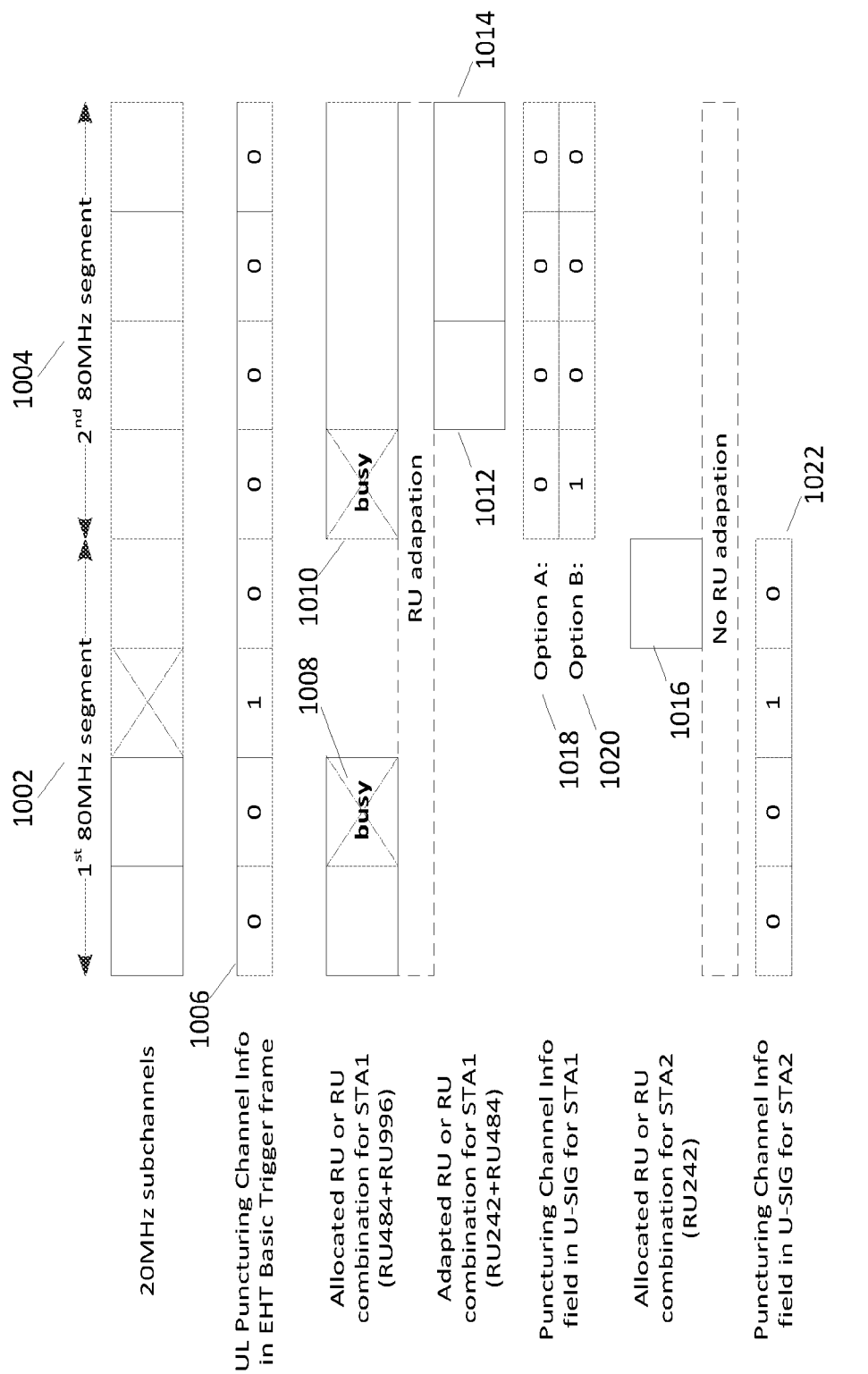
FIG. 10 shows a diagram illustrating how RU adaptation is achieved according to a second embodiment.

FIG. 10 shows a diagram 1000 illustrating how RU adaptation is achieved by STA1 and STA2 for respective EHT TB PPDU transmissions with a BW of 160 MHz which comprises two 80 MHz frequency segments 1002 and 1004 according to the second embodiment. A soliciting EHT Basic Trigger frame for this example may have the following properties. Within the Common Info field of the EHT Basic Trigger frame, the CS Required field is set to 1 to indicate ED-based CCA is required, the UL BW field indicates UL BW=160/80+80 MHz, and the two UL Puncturing Channel Info subfields are set to 0010 and 0000 respectively (see reference 1006). Namely the $3^{rd}$ 20 MHz subchannel within the 80 MHz frequency segment 1002 is punctured. Within the User Info fields for STA1 & STA2 in the EHT Basic Trigger frame, RU Allocation fields indicate that a RU combination of the $1^{st}$ RU484 and the $2^{nd}$ RU996 is allocated to STA1 and the $4^{th}$ RU242 is allocated to STA2. Further, the RU Adaptation Disable field is set to 0 for STA1 and set to 1 for STA2.

RU adaptation according to ED-based CCA results may be as follows. For STA1, the $2^{nd}$ 20 MHz subchannel 1008 and the $5^{th}$ 20 MHz subchannel 1010 are considered to be busy while remaining 20 MHz subchannels overlapping with the $1^{st}$ RU484 and the $2^{nd}$ RU996 are considered to be idle. The allocated RU combination for STA1 is adapted to a RU combination of the $2^{nd}$ RU242 1012 and the $2^{nd}$ RU484 1014 within the $2^{nd}$ RU996. For STA2, the $4^{th}$ 20 MHz subchannel 1016 is considered to be idle. Further, within the U-SIG of the EHT TB PPDU to be transmitted for STA1, the Puncturing Channel Info field is set to 0000 (see reference 1018) and Adapted RU Allocation field is set to 3 if under Option A, or the Puncturing Channel Info field is set to 1000 (see reference 1020) if under Option B. For the U-SIG of the EHT TB PPDU to be transmitted for STA2, the Puncturing Channel Info field is set to 0000 (see reference 1022).

An EHT TB PPDU transmission procedure performed by a STA when receiving an EHT Basic Trigger frame requesting the STA to perform ED-based CCA before EHT TB PPDU transmission for the second embodiment is similar to the first embodiment (i.e. as shown in flow diagram 600 of FIG. 6), except that the U-SIG of the EHT TB PPDU is set according to Option A or Option B.

According to the second embodiment, when an AP receives an EHT TB PPDU transmitted by a STA with the RU adaptation disabled, the AP decodes the EHT TB PPDU according to the allocated RU or RU combination using an 802.11ax-like EHT TB PPDU reception procedure. On the other hand, if the EHT TB PPDU is transmitted by a STA with the RU adaptation enabled, the AP decodes the EHT TB PPDU according to the following procedure:

determine the adapted RU or RU combination from the Adapted RU Allocation field or Puncturing Channel Info field in the U-SIG field of the EHT TB PPDU; and decode the remaining EHT TB PPDU according to the adapted RU or RU combination.

Figure 11:
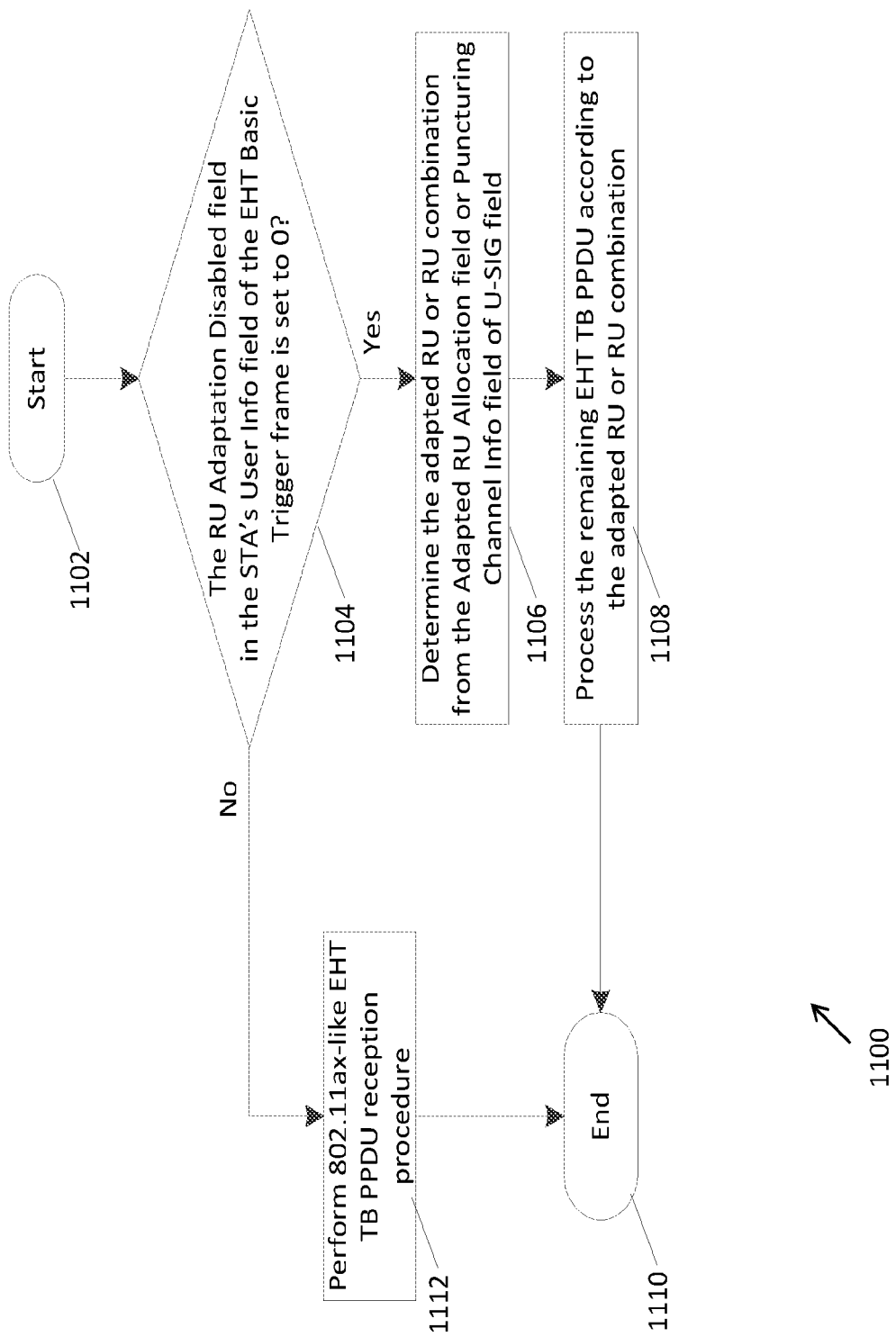
FIG. 11 depicts a flow diagram illustrating an EHT TB PPDU reception procedure according to a second embodiment.

FIG. 11 depicts a flow diagram illustrating an EHT TB PPDU reception procedure performed by an AP when the STA is requested to perform ED-based CCA before EHT TB PPDU transmission according to the second embodiment. The process begins at step 1102. At step 1104, it is determined whether the RU Adaptation Disabled field in the STA's User Info field of the EHT Basic Trigger frame is set to 0. If it is determined that this is not the case, the process proceeds to step 1112 where an 802.11ax-like EHT TB PPDU reception procedure is performed, and the process then ends at step 1110. Otherwise, the process proceeds from step 1104 to step 1106 where the adapted RU or RU combination rom the Adapted RU Allocation field or Puncturing Channel Info field of U-SIG field is determined, At step 1108, the remaining EHT TB PPDU is processed according to the adapted RU or RU combination. The process then ends at step 1110.

According to a third embodiment, STA behaviour for implementing EHT TB PPDU transmission is as follows. When a RU adaptation procedure is performed by a STA, an 802.11ax-like EHT TB PPDU transmission procedure is performed by the STA. When a RU adaptation procedure is performed by a STA and the allocated RU or RU combination for the STA is adapted to one of its associated RUs or RU combinations according to results of ED-based CCA performed by the STA, the STA prepares an EHT TB PPDU according to the adapted RU or RU combination, common transmission parameters (including additional packet padding duration) and other user-specific transmission parameters (excluding the allocated RU or RU combination) indicated in the Common Info field and the STA's User Info field of the soliciting EHT Basic Trigger frame. The EHT TB PPDU is prepared by the STA in a similar manner to 802.11ax, followed by additional packet padding so that AP has enough time to perform blind decoding on the EHT TB PPDU. Further, when a RU adaptation procedure is performed by a STA and the allocated RU or RU combination for a STA is not adapted to any of its associated RUs or RU combinations according to results of ED-based CCA performed by the STA, the STA does not transmit an EHT TB PPDU.

Figure 12:
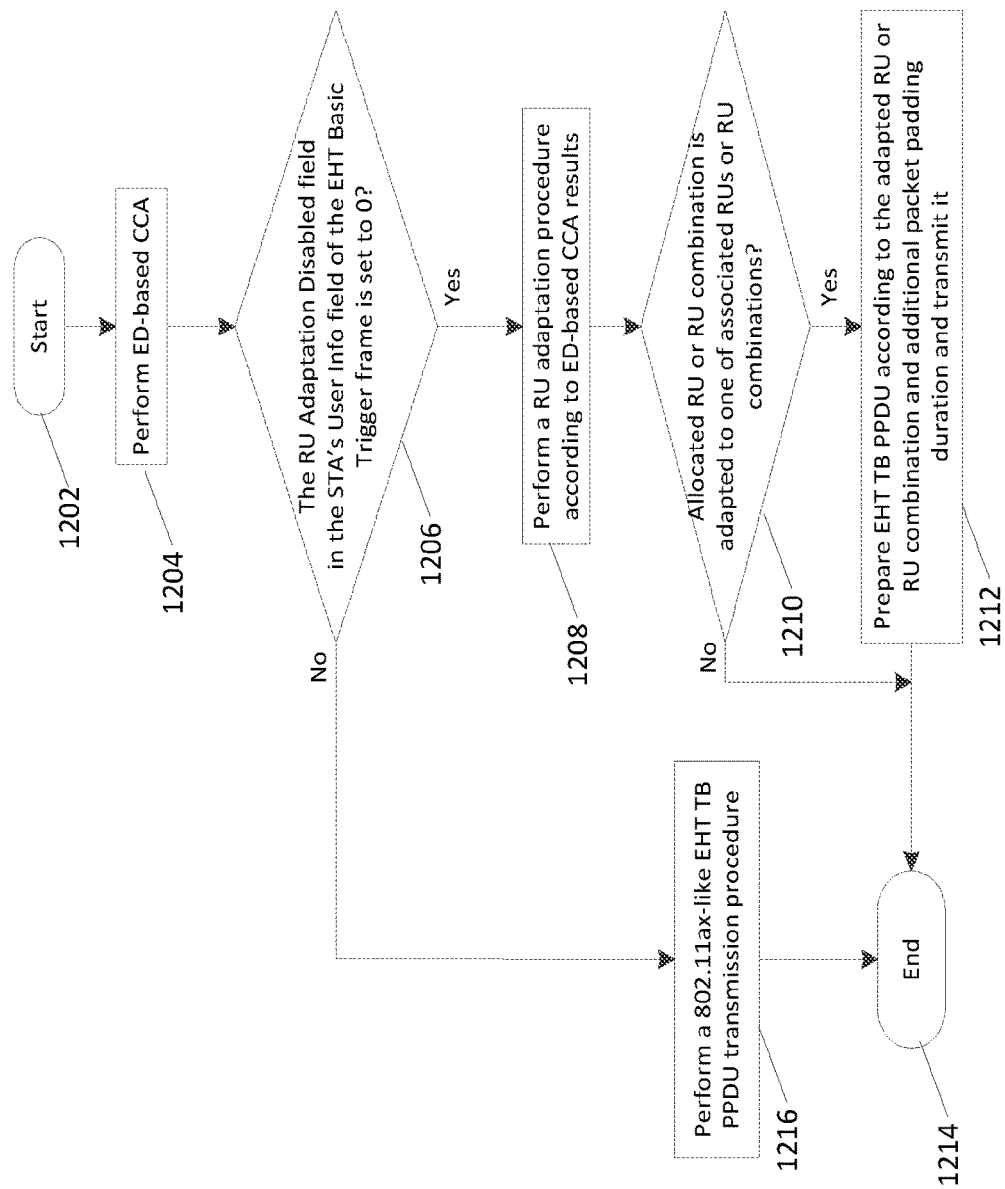
FIG. 12 depicts a flow diagram illustrating an EHT TB PPDU transmission procedure according to a third embodiment

An EHT TB PPDU transmission procedure performed by a STA when receiving an EHT Basic Trigger frame requesting the STA to perform ED-based CCA before EHT TB PPDU transmission according to the third embodiment is illustrated in flow diagram 1200 of FIG. 12. The process begins at step 1202. At step 1204, ED-based CCA is performed by the STA. At step 1206, it is determined whether the RU Adaptation Disabled field in the STA's User Info field of the EHT Basic Trigger frame is set to 0. If it is determined that this is not the case, the process proceeds to step 1216 where an 802.11ax-like EHT TB PPDU transmission procedure is performed, and then the process ends at step 1214. On the other hand, if it is determined at step 1206 that the RU Adaptation Disabled field in the STA's User Info field of the EHT Basic Trigger frame is set to 0, the process proceeds to step 1208 where a RU adaptation procedure is performed according to ED-based CCA results. At step 1210, it is determined whether an allocated RU or RU combination is adapted to one of its associated RUs or RU combinations. If it is determined that this is not the case, the process ends at step 1214. Otherwise, the process proceeds to step 1212 wherein an EHT TB PPDU is prepared according to the adapted RU or RU combination and additional packet padding duration and then transmitted. The process then ends at step 1214.

According to the third embodiment, AP behaviour for implementing trigger-based UL MU transmission is as follows. When transmitting an EHT Basic Trigger frame to solicit EHT TB PPDU transmission, the Common Info field comprises an Additional Packet Padding Duration field to indicate addition packet padding duration on top of the normal packet padding. When receiving an EHT TB PPDU transmitted by a STA with the RU adaptation disabled, the AP decodes the EHT TB PPDU according to the allocated RU or RU combination using an 802.11ax-like EHT TB PPDU reception procedure. On the other hand, when receiving an EHT TB PPDU transmitted by a STA with the RU adaptation enabled, the AP decodes the EHT TB PPDU according to the following procedure:

determine the RU or RU combinations associated with the allocated RU or RU combination, and perform blind decoding on the EHT TB PPDU according to the associated RUs or RU combinations.

Figure 13:
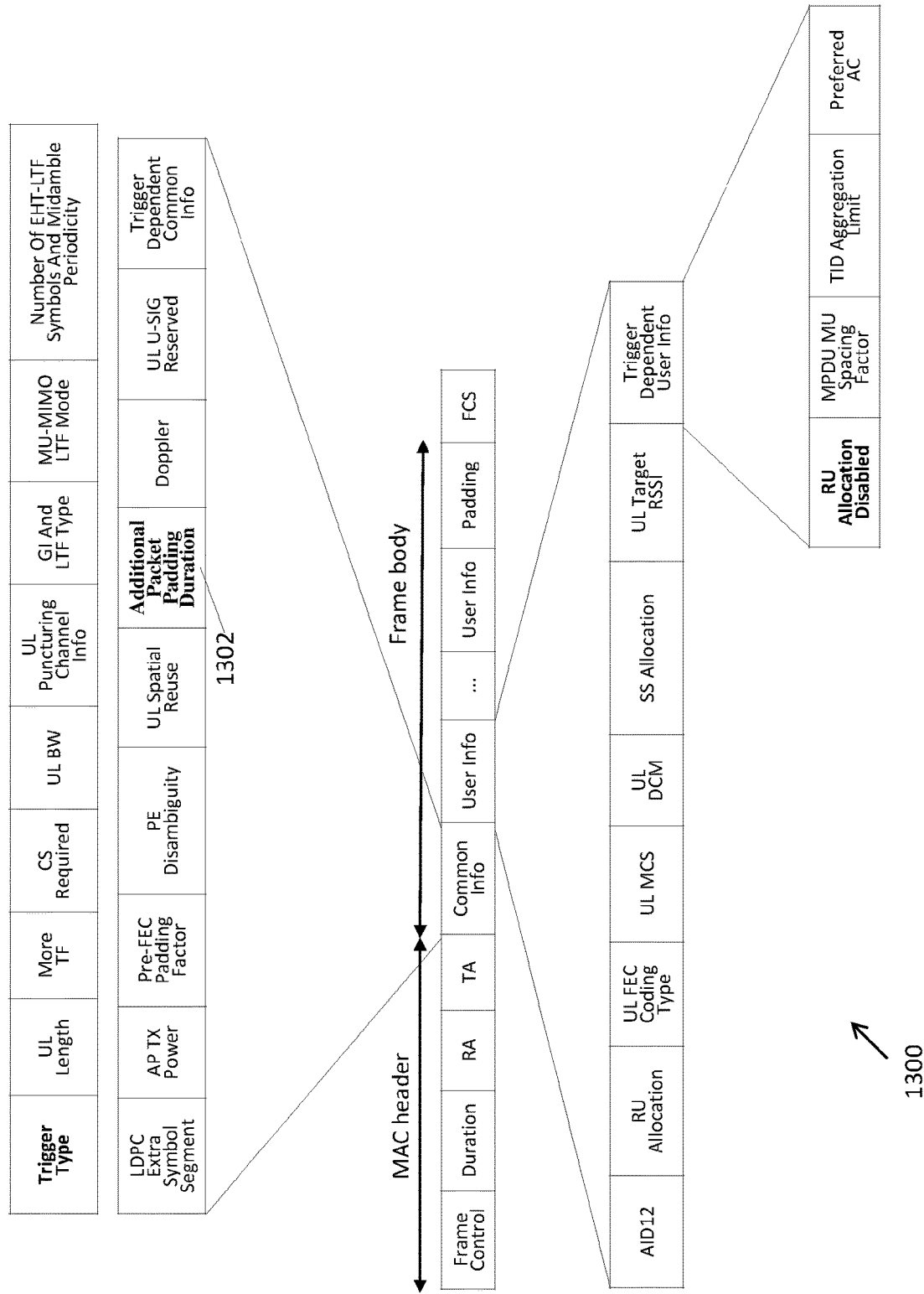
FIG. 13 shows a format of an EHT Basic Trigger frame according to a third embodiment.

FIG. 13 shows a format of an EHT Basic Trigger frame 1300 according to the third embodiment. While similar to the EHT Basic Trigger frame 400 in FIG. 4, the Common Info field of the EHT Basic Trigger frame 1300 comprises a new Additional Packet Padding Duration field 1302 which, as described above, indicates additional packet padding duration on top of the normal packet padding.

FIG. 14 shows a table 1400 illustrating number of blind decoding required for each of RUs or RU combinations larger than 242 tones according to the third embodiment. For example, referring to RU484, the associated RU or RU combinations are RU484 and RU242 (two options), and thus the number of blind decoding required is 3. Referring to RU242+RU484, the associated RU or RU combinations are RU242+RU484 and RU484, and thus the number of blind decoding required is 2.

Figure 15:
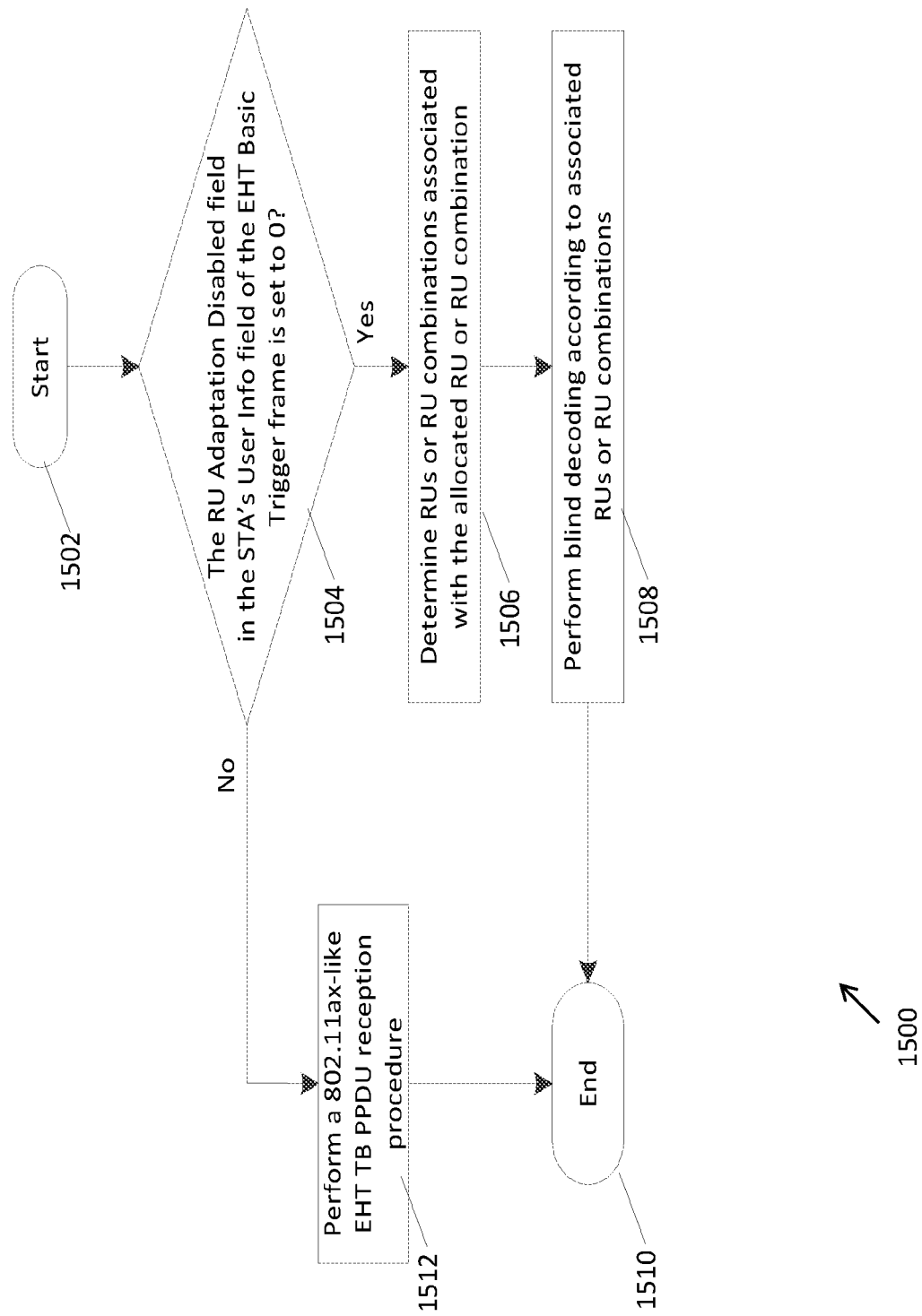
FIG. 15 depicts a flow diagram illustrating an EHT TB PPDU reception procedure according to a third embodiment.

FIG. 15 depicts a flow diagram illustrating an EHT TB PPDU reception procedure performed by an AP when the STA is requested to perform ED-based CCA before EHT TB PPDU transmission according to the third embodiment. The process begins at step 1502. At step 1504, it is determined whether the RU Adaptation Disabled field in the STA's User Info field of the EHT Basic Trigger frame is set to 0. If it is determined that this is not the case, the process proceeds to step 1512 where an 802.11ax-like EHT TB PPDU reception procedure is performed, and the process then ends at step 1510. Otherwise, the process proceeds from step 1504 to step 1506 where RU or RU combination associated with the allocated RU or RU combination are determined. At step 1508, blind decoding according to associated RU or RU combinations is performed. The process then ends at step 1510.

Advantageously, unlike the first and second embodiments, in an trigger-based UL MU transmission, RU adaptation can be enabled for a STA engaged in a MU-MIMO transmission according to the third embodiment.

Figure 16:
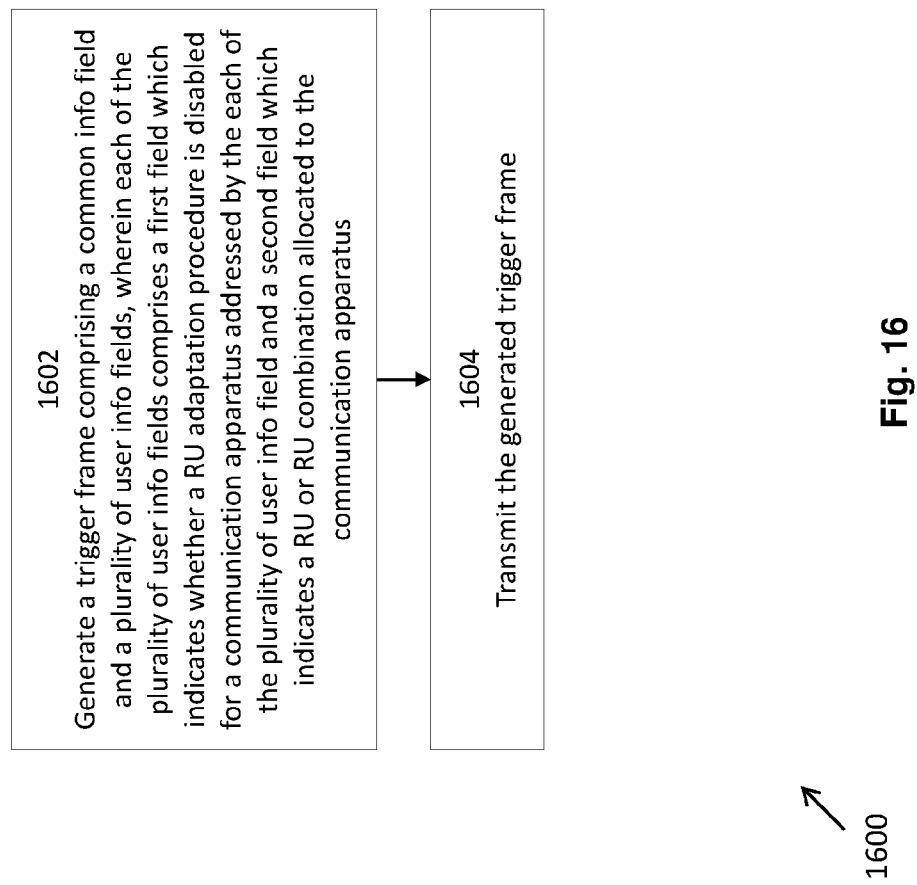
FIG. 16 shows a flow diagram illustrating a method for implementing trigger-based uplink multiuser transmission according to various embodiments.

FIG. 16 shows a flow diagram 1600 illustrating a communication method according to various embodiments. At step 1602, a trigger frame comprising a common info field and a plurality of user info fields, wherein each of the plurality of user info fields comprises a first field which indicates whether a RU adaptation procedure is disabled for a communication apparatus addressed by the each of the plurality of user info field and a second field which indicates a RU or RU combination allocated to the communication apparatus. At step 1604, the generated trigger frame is transmitted.

Figure 17:
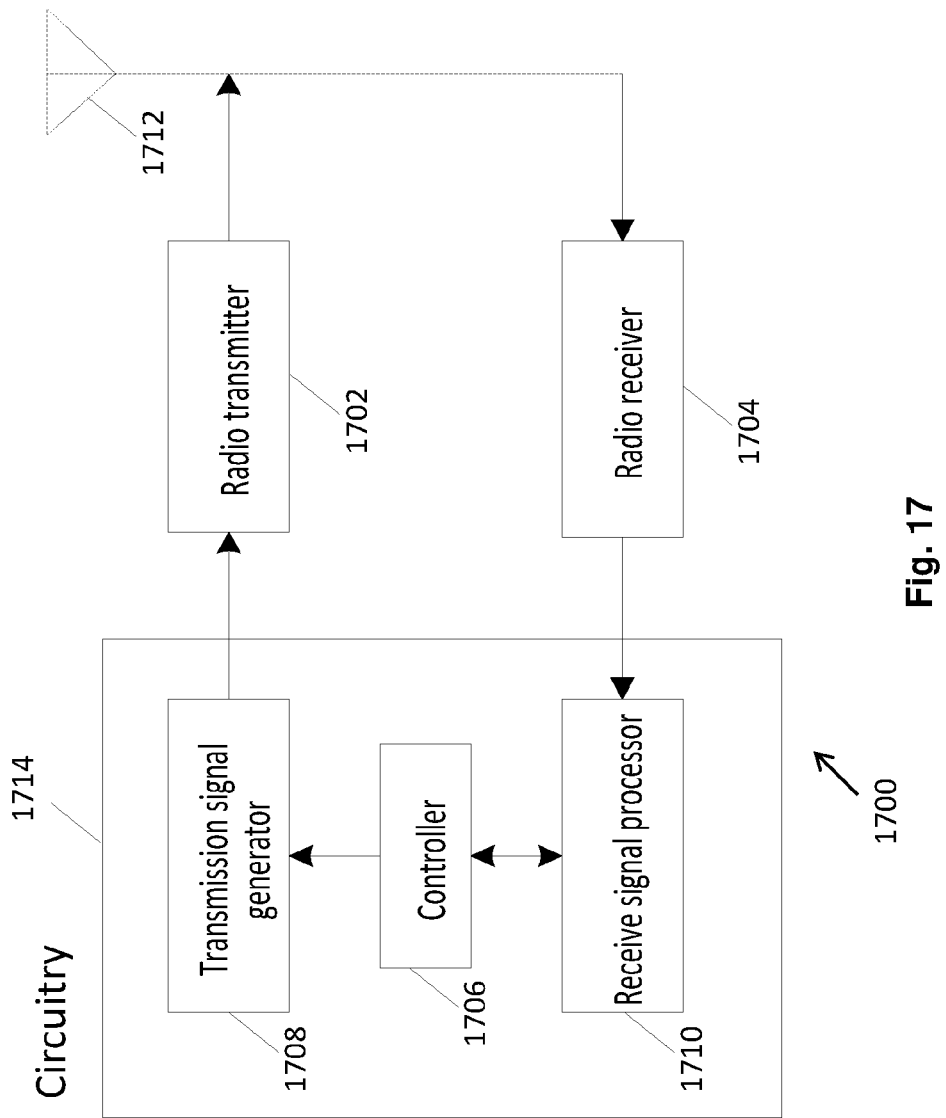
FIG. 17 shows a schematic, partially sectioned view of a communication apparatus that can be implemented for trigger-based uplink multiuser transmission in accordance with various embodiments.

FIG. 17 shows a schematic, partially sectioned view of a communication apparatus 1700 that can be implemented for trigger-based UL MU transmission in accordance with the first to third embodiments. The communication apparatus 1700 may be implemented as a STA or an AP according to various embodiments.

Various functions and operations of the communication apparatus 1700 are arranged into layers in accordance with a hierarchical model. In the model, lower layers report to higher layers and receive instructions therefrom in accordance with IEEE specifications. For the sake of simplicity, details of the hierarchical model are not discussed in the present disclosure.

As shown in FIG. 17, the communication apparatus 1700 may include circuitry 1714, at least one radio transmitter 1702, at least one radio receiver 1704 and multiple antennas 1712 (for the sake of simplicity, only one antenna is depicted in FIG. 17 for illustration purposes). The circuitry may include at least one controller 1706 for use in software and hardware aided execution of tasks it is designed to perform, including control of communications with one or more other communication apparatuses such as APs and STAs in a MIMO wireless network. The at least one controller 1706 may control at least one transmission signal generator 1708 for generating frames to be sent through the at least one radio transmitter 1702 to one or more other STAs or APs and at least one receive signal processor 1710 for processing frames received through the at least one radio receiver 1704 from the one or more other STAs or APs. The at least one transmission signal generator 1708 and the at least one receive signal processor 1710 may be stand-alone modules of the communication apparatus 1700 that communicate with the at least one controller 1706 for the above-mentioned functions. Alternatively, the at least one transmission signal generator 1708 and the at least one receive signal processor 1710 may be included in the at least one controller 1706. It is appreciable to those skilled in the art that the arrangement of these functional modules is flexible and may vary depending on the practical needs and/or requirements. The data processing, storage and other relevant control apparatus can be provided on an appropriate circuit board and/or in chipsets.

In various embodiments, when in operation, the at least one radio transmitter 1702, at least one radio receiver 1704, and at least one antenna 1712 may be controlled by the at least one controller 1706. Furthermore, while only one radio transmitter 1702 is shown, it will be appreciated that there can be more than one of such transmitters.

In various embodiments, when in operation, the at least one radio receiver 1704, together with the at least one receive signal processor 1710, forms a receiver of the communication apparatus 1700. The receiver of the communication apparatus 1700, when in operation, provides functions required for trigger-based UL MU communication. While only one radio receiver 1704 is shown, it will be appreciated that there can be more than one of such receivers.

The communication apparatus 1700, when in operation, provides functions required for trigger-based UL MU transmission. For example, the circuitry 1714 may, in operation, generate a trigger frame comprising a common info field and a plurality of user info fields, wherein each of the plurality of user info fields comprises a first field which indicates whether a RU adaptation procedure is disabled for another communication apparatus addressed by the each of the plurality of user info field and a second field which indicates a RU or RU combination allocated to the another communication apparatus. The transmitter 1702 may, in operation, transmit the generated trigger frame.

The RU adaptation procedure may be disabled for the another communication apparatus when the allocated RU or RU combination has a size not larger than 242 tones. The common info field of the trigger frame may comprise a field which indicates additional packet padding duration. The allocated RU or RU combination may be associated with two or more RU or RU combinations. Each of the two or more RU or RU combinations associated with the allocated RU or RU combination may have a size not larger than the allocated RU or RU combination. Each of the two or more RU or RU combinations associated with the allocated RU or RU combination may be a large-size RU or RU combination allowed for EHT WLAN.

When the RU adaptation procedure is performed by the another communication apparatus and part of the allocated RU or RU combination which is considered to be idle matches one of the two or more RU or RU combinations associated with the allocated RU or RU combination, the allocated RU or RU combination may be adapted to the one of the two or more RU or RU combinations associated with the allocated RU or RU combination.

When the RU adaptation procedure is performed by the another communication apparatus and part of the allocated RU or RU combination which is considered to be idle does not match any of the two or more RUs or RU combinations associated with the allocated RU or RU combination but covers at least one of the two or more RUs or RU combinations associated with the allocated RU or RU combination, the allocated RU or RU combination may be adapted to the at least one of the two or more RUs or RU combinations associated with the allocated RU or RU combination which overlaps with the part of the allocated RU or RU combination to the most extent.

When the RU adaptation procedure is performed by the another communication apparatus and part of the allocated RU or RU combination which is considered to be idle does not match or cover any of the two or more RUs or RU combinations associated with the allocated RU or RU combination, the allocated RU or RU combination may not be adapted to any of the two or more RUs or RU combinations associated with the allocated RU or RU combination.

The receiver 1704 may, in operation, receive a trigger-based PPDU transmitted by the another communication apparatus. The circuitry 1714 may be further configured to perform signal detection using one or more fields of the trigger-based PPDU transmitted in all 20 MHz subchannels corresponding to the allocated RU or RU combination, and determine a RU or RU combination which is adapted by the another communication apparatus from the allocated RU or RU combination according to CCA results. A U-SIG field of the trigger-based PPDU may comprise a signaling field which indicates a RU or RU combination which is adapted by the another communication apparatus from the allocated RU or RU combination according to CCA results. The signaling field may further indicate puncturing channel information in an 80 MHz frequency segment in which the U-SIG field of the trigger-based PPDU is transmitted.

The circuitry 1714 may be further configured to apply blind decoding to the received trigger-based PPDU according to the two or more RUs or RU combinations associated with the allocated RU or RU combination.

As described above, the embodiments of the present disclosure provide an advanced communication system, communication methods and communication apparatuses that enable trigger-based UL MU transmission.

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such a communication apparatus include a phone (e.g. cellular (cell) phone, smart phone), a tablet, a personal computer (PC) (e.g. laptop, desktop, netbook), a camera (e.g. digital still/video camera), a digital player (digital audio/video player), a wearable device (e.g. wearable camera, smart watch, tracking device), a game console, a digital book reader, a telehealth/telemedicine (remote health and medicine) device, and a vehicle providing communication functionality (e.g. automotive, airplane, ship), and various combinations thereof.

The communication apparatus is not limited to be portable or movable, and may also include any kind of apparatus, device or system being non-portable or stationary, such as a smart home device (e.g. an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

It will be understood that while some properties of the various embodiments have been described with reference to a communication apparatus, corresponding properties also apply to the methods of various embodiments, and vice versa.

While exemplary embodiments have been presented in the foregoing detailed description of the present embodiments, it should be appreciated that a vast number of variations exist. It should further be appreciated that the exemplary embodiments are examples, and are not intended to limit the scope, applicability, operation, or configuration of this disclosure in any way. Rather, the foregoing detailed description will provide those skilled in the art with a convenient road map for implementing exemplary embodiments, it being understood that various changes may be made in the function and arrangement of steps and method of operation described in the exemplary embodiments and modules and structures of devices described in the exemplary embodiments without departing from the scope of the subject matter as set forth in the appended claims.

The invention claimed is:

1. A communication apparatus comprising:
circuitry, which in operation, generates a trigger frame comprising a common info field and a plurality of user info fields; and
a transmitter, which in operation, transmits the generated trigger frame;
wherein each of the plurality of user info fields comprises a first field which indicates whether a resource unit (RU) adaptation procedure is disabled for another communication apparatus addressed by the each of the plurality of user info field and a second field which indicates a RU or RU combination allocated to the another communication apparatus, and
wherein when the RU adaptation procedure is performed by the another communication apparatus and part of the allocated RU or RU combination which is considered to be idle matches one of two or more RUs or RU combinations associated with the allocated RU or RU combination, the allocated RU or RU combination is adapted to the one of the two or more RUs or RU combinations associated with the allocated RU or RU combination.

2. The communication apparatus according to claim 1, wherein the RU adaptation procedure is disabled for the another communication apparatus when the allocated RU or RU combination has a size not larger than 242 tones.

3. The communication apparatus according to claim 1, wherein the common info field of the trigger frame comprises a field which indicates additional packet padding duration.

4. The communication apparatus according to claim 1, wherein the allocated RU or RU combination is associated with the two or more RU or RU combinations.

5. The communication apparatus according to claim 1, wherein each of the two or more RU or RU combinations associated with the allocated RU or RU combination has a size not larger than the allocated RU or RU combination.

6. The communication apparatus according to claim 1, wherein each of the two or more RU or RU combinations associated with the allocated RU or RU combination is a large-size RU or RU combination allowed for Extremely High Throughput wireless local area network (EHT WLAN).

7. The communication apparatus according to claim 1, wherein the communication apparatus further comprises a receiver, which in operation, receives a trigger-based physical layer protocol data unit (PPDU) transmitted by the another communication apparatus.

8. The communication apparatus according to claim 7, wherein the circuitry is further configured to:
perform signal detection using one or more fields of the trigger-based PPDU transmitted in all 20 MHz sub-channels corresponding to the allocated RU or RU combination, and
determine a RU or RU combination which is adapted by the another communication apparatus from the allocated RU or RU combination according to clear channel assessment (CCA) results.

9. The communication apparatus according to claim 7, wherein a universal signal (U-SIG) field of the trigger-based PPDU comprises a signaling field which indicates a RU or RU combination which is adapted by the another communication apparatus from the allocated RU or RU combination according to CCA results.

10. The communication apparatus according to claim 9, wherein the signaling field further indicates puncturing channel information in an 80 MHz frequency segment in which the U-SIG field of the trigger-based PPDU is transmitted.

11. The communication apparatus according to claim 7, wherein the circuitry is further configured to apply blind decoding to the received trigger-based PPDU according to the two or more RU or RU combinations associated with the allocated RU or RU combination.

12. A communication apparatus comprising:
circuitry, which in operation, generates a trigger frame comprising a common info field and a plurality of user info fields; and
a transmitter, which in operation, transmits the generated trigger frame;
wherein each of the plurality of user info fields comprises a first field which indicates whether a resource unit (RU) adaptation procedure is disabled for another communication apparatus addressed by the each of the plurality of user info field and a second field which indicates a RU or RU combination allocated to the another communication apparatus, and
wherein when the RU adaptation procedure is performed by the another communication apparatus and part of the allocated RU or RU combination which is considered to be idle does not match any of two or more RUs or RU combinations associated with the allocated RU or RU combination but covers at least one of the two or more RUs or RU combinations associated with the allocated RU or RU combination, the allocated RU or RU combination is adapted to the at least one of the two or more RUs or RU combinations associated with the allocated RU or RU combination which overlaps with the part of the allocated RU or RU combination to the most extent.

13. A communication apparatus comprising:
circuitry, which in operation, generates a trigger frame comprising a common info field and a plurality of user info fields; and
a transmitter, which in operation, transmits the generated trigger frame;
wherein each of the plurality of user info fields comprises a first field which indicates whether a resource unit (RU) adaptation procedure is disabled for another communication apparatus addressed by the each of the plurality of user info field and a second field which indicates a RU or RU combination allocated to the another communication apparatus, and
wherein when the RU adaptation procedure is performed by the another communication apparatus and part of the allocated RU or RU combination which is considered to be idle does not match or cover any of two or more RUs or RU combinations associated with the allocated RU or RU combination, the allocated RU or RU combination is not adapted to any of the two or more RUs or RU combinations associated with the allocated RU or RU combination.

14. A communication method comprising:
generating a trigger frame comprising a common info field and a plurality of user info fields; and
transmitting the generated trigger frame;
wherein each of the plurality of user info fields comprises a first field which indicates whether a RU adaptation procedure is disabled for a communication apparatus addressed by the each of the plurality of user info field and a second field which indicates a RU or RU combination allocated to the communication apparatus, and
wherein when the RU adaptation procedure is performed by another communication apparatus and part of the allocated RU or RU combination which is considered to be idle matches one of two or more RUs or RU combinations associated with the allocated RU or RU combination, the allocated RU or RU combination is adapted to the one of the two or more RUs or RU combinations associated with the allocated RU or RU combination.

* * * * *